United States Patent
Wheeland et al.

(10) Patent No.: US 9,484,766 B2
(45) Date of Patent: Nov. 1, 2016

(54) WIRELESS POWER TRANSMITTER TUNING

(71) Applicant: QUALCOMM Incorporated, San Diego, CA (US)

(72) Inventors: Cody Burton Wheeland, San Diego, CA (US); Xiaoyu Liu, San Diego, CA (US); Gabriel Isaac Mayo, North Potomac, MD (US)

(73) Assignee: QUALCOMM INCORPORATED, San Diego, CA (US)

( * ) Notice: Subject to any disclaimer, the term of this patent is extended or adjusted under 35 U.S.C. 154(b) by 561 days.

(21) Appl. No.: 14/108,007

(22) Filed: Dec. 16, 2013

(65) Prior Publication Data

US 2015/0171657 A1    Jun. 18, 2015

(51) Int. Cl.
| | |
|---|---|
| *H02J 7/02* | (2016.01) |
| *H02J 17/00* | (2006.01) |
| *H04B 5/00* | (2006.01) |
| *H02J 1/02* | (2006.01) |

(52) U.S. Cl.
CPC ............... *H02J 7/025* (2013.01); *H02J 17/00* (2013.01); *H04B 5/0037* (2013.01)

(58) Field of Classification Search
CPC ........................................................ H02J 1/02
USPC ........................................................ 307/104
See application file for complete search history.

(56) References Cited

U.S. PATENT DOCUMENTS

| | | |
|---|---|---|
| 7,495,515 B1 | 2/2009 | Branch et al. |
| 2007/0145830 A1 | 6/2007 | Lee et al. |
| 2009/0243397 A1 | 10/2009 | Cook et al. |
| 2009/0256631 A1 | 10/2009 | Bockelman et al. |
| 2010/0090770 A1 | 4/2010 | Matsuo |
| 2010/0172168 A1 | 7/2010 | Fells |
| 2012/0267960 A1 | 10/2012 | Low et al. |
| 2013/0154383 A1 | 6/2013 | Kasturi et al. |
| 2013/0173078 A1 | 7/2013 | Divan et al. |

FOREIGN PATENT DOCUMENTS

WO    WO-2013091875 A2    6/2013

OTHER PUBLICATIONS

International Search Report and Written Opinion—PCT/US2014/068336—ISA/EPO—Mar. 13, 2015.

*Primary Examiner* — Robert Deberadinis
(74) *Attorney, Agent, or Firm* — Knobbe, Martens, Olson & Bear LLP

(57) ABSTRACT

This disclosure provides systems, methods and apparatus for tuning a wireless power transmitter. In one aspect a device configured to wirelessly provide power to a load is provided. The device includes a signal driver configured to provide power along a power path. The device further includes a first tuning circuit along the power path, configured to tune reactance at the signal driver, introducing undesired harmonic content. The device further includes a second tuning circuit along the power path, configured to tune reactance at the signal driver and to generate complementary harmonic content, at least partly canceling the harmonic generated at the first tuning circuit.

21 Claims, 17 Drawing Sheets

WIRELESS POWER TRANSMITTER TUNING

FIELD

The present invention relates generally to wireless power. More specifically, the disclosure is directed to tuning a wireless power transmitter.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power. As such, these devices constantly require recharging. Rechargeable devices are often charged via wired connections that require cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices may overcome some of the deficiencies of wired charging solutions. As such, wireless charging systems and methods that efficiently and safely transfer power for charging rechargeable electronic devices are desirable.

SUMMARY OF THE INVENTION

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect provides a device configured to provide wireless power. The device includes a signal driver configured to provide power along a power path. The device further includes a first tuning circuit along the power path, configured to tune reactance at the signal driver and generating a harmonic content. The device further includes a second tuning circuit along the power path, configured to tune reactance at the signal driver and to generate complementary harmonic content at least partly canceling the harmonic generated at the first tuning circuit.

In various embodiments, at least one of the first and second tuning circuits can include a switch configured to adjust a reactance of the power path. In various embodiments, at least one of the first and second tuning circuits can include switch in parallel with a reactive element, and wherein at least one of the first and second tuning circuits is configured to adjust the reactance of the transmit circuit by opening or closing the switch. In various embodiments, the reactive element can include a capacitor.

In various embodiments, the device can further include a transmit coil having a center tap. In various embodiments, the signal driver can include a differential driver. In various embodiments, the signal driver can include a single-ended driver.

In various embodiments, at least one of the first and second tuning circuits can include a two or more transistors. The two or more transistors can be in parallel with a reactive element. At least one of the first and second tuning circuits can be configured to adjust the reactance of the transmit circuit by enabling the two or more transistors. In various embodiments, the transmit circuit is configured to wirelessly provide power to a receive circuit to provide power to the load. The receiver circuit can be configured to resonate at the resonant frequency.

Another aspect provides a method of providing wireless power. The method includes providing, at a signal driver, power along a power path. The method further includes generating a harmonic at a first tuning circuit along the power path. The method further includes generating another harmonic at a second tuning circuit along the power path. The another harmonic at least partly cancels the harmonic generated at the first tuning circuit.

In various embodiments, at least one of the first and second tuning circuits can include a switch configured to adjust a reactance of the power path. In various embodiments, at least one of the first and second tuning circuits can include switch in parallel with a reactive element, and wherein at least one of the first and second tuning circuits is configured to adjust the reactance of the transmit circuit by opening or closing the switch. In various embodiments, the reactive element can include a capacitor.

In various embodiments, the method can further include providing wireless power to a receiver via a transmit coil having a center tap. In various embodiments, the method can further include providing power can include providing a differential signal. In various embodiments, the method can further include providing power can include providing a single-ended signal.

In various embodiments, at least one of the first and second tuning circuits can include a two or more transistors. The two or more transistors can be in parallel with a reactive element, the method further including adjusting the reactance of the transmit circuit by enabling the two or more transistors. In various embodiments, the method can further include providing power to a receive circuit to provide power to the load. The receiver circuit can be configured to resonate at the resonant frequency.

Another aspect provides an apparatus for providing wireless power. The apparatus includes means for providing power along a power path. The apparatus further includes first means for tuning the power path and generating a harmonic. The apparatus further includes second means for tuning the power path and generating another harmonic. The another harmonic at least partly cancels the harmonic generated by the first means for tuning.

Another aspect provides a non-transitory computer-readable medium. The medium includes code that, when executed, causes an apparatus to provide power along a power path. The medium further includes code that, when executed, causes the apparatus to generate a harmonic at a first tuning circuit along the power path. The medium further includes code that, when executed, causes the apparatus to generate another harmonic at a second tuning circuit along the power path. The another harmonic at least partly cancels the harmonic generated at the first tuning circuit.

Figure 1:
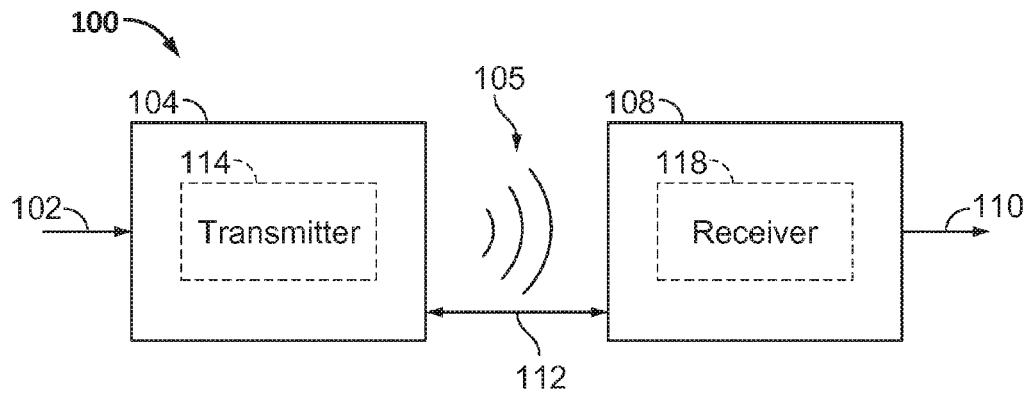
FIG. 1 is a functional block diagram of an exemplary wireless power transfer system, in accordance with exemplary embodiments of the invention.

The various features illustrated in the drawings may not be drawn to scale. Accordingly, the dimensions of the various features may be arbitrarily expanded or reduced for clarity. In addition, some of the drawings may not depict all of the circuits of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. The exemplary embodiments of the invention may be practiced without these specific details. In some instances, well-known structures and devices are shown in block diagram form in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

FIG. 1 is a functional block diagram of an exemplary wireless power transfer system 100, in accordance with exemplary embodiments of the invention. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils that require coils to be very close (e.g., mms). Resonant inductive coupling techniques may thus allow for improved efficiency and power transfer over various distances and with a variety of coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit coil 114 for outputting an energy transmission. The receiver 108 further includes a receive coil 118 for receiving or capturing energy from the energy transmission. The near-field may correspond to a region in which there are strong reactive fields resulting from the currents and charges in the transmit coil 114 that minimally radiate power away from the transmit coil 114. In some cases the near-field may correspond to a region that is within about one wavelength (or a fraction thereof) of the transmit coil 114. The transmit and receive coils 114 and 118 are sized according to applications and devices to be associated therewith. As described above, efficient energy transfer may occur by coupling a large portion of the energy in a field 105 of the transmit coil 114 to a receive coil 118 rather than propagating most of the energy in an electromagnetic wave to the far field. When positioned within the field 105, a "coupling mode" may be developed between the transmit coil 114 and the receive coil 118. The area around the transmit and receive coils 114 and 118 where this coupling may occur is referred to herein as a coupling-mode region.

Figure 2:
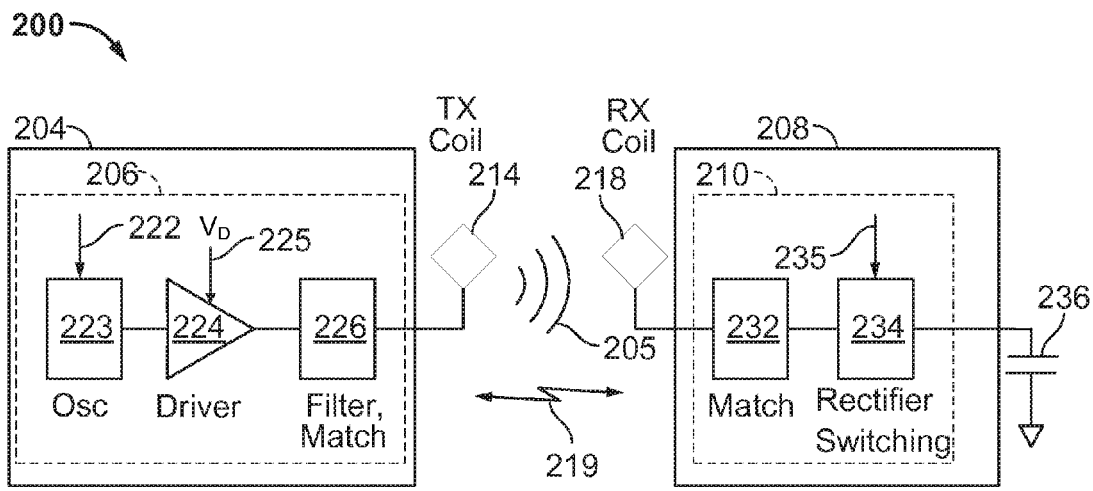
FIG. 2 is a functional block diagram of exemplary circuits that may be used in the wireless power transfer system of FIG. 1, in accordance with various exemplary embodiments of the invention.

FIG. 2 is a functional block diagram of exemplary circuits that may be used in the wireless power transfer system 100 of FIG. 1, in accordance with various exemplary embodiments of the invention. The transmitter 204 may include transmit circuitry 206 that may include an oscillator 223, a driver circuit 224, and a filter and matching circuit 226. The oscillator 223 may be configured to generate a signal at a desired frequency, such as 468.75 KHz, 6.78 MHz or 13.56 MHz, that may be adjusted in response to a frequency control signal 222. The oscillator signal may be provided to a driver circuit 224 configured to drive the transmit coil 214 at, for example, a resonant frequency of the transmit coil 214. The driver circuit 224 may be a switching amplifier configured to receive a square wave from the oscillator 223 and output a sine wave. For example, the driver circuit 224 may be a class E amplifier. A filter and matching circuit 226 may be also included to filter out harmonics or other unwanted frequencies and match the impedance of the transmitter 204 to the transmit coil 214.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive coil 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

As described more fully below, receiver 208, that may initially have a selectively disablable associated load (e.g., battery 236), may be configured to determine whether an amount of power transmitted by transmitter 204 and receiver by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
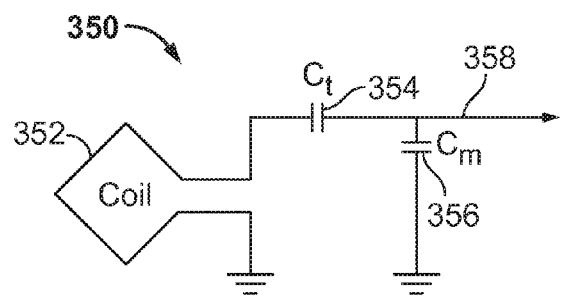
FIG. 3 is a schematic diagram of a portion of transmit circuitry or receive circuitry of FIG. 2 including a transmit or receive coil, in accordance with exemplary embodiments of the invention.

FIG. 3 is a schematic diagram of a portion of transmit circuitry 206 or receive circuitry 210 of FIG. 2 including a transmit or receive coil 352, in accordance with exemplary embodiments of the invention. As illustrated in FIG. 3, transmit or receive circuitry 350 used in exemplary embodiments may include a coil 352. The coil may also be referred to or be configured as a "loop" antenna 352. The coil 352 may also be referred to herein or be configured as a "magnetic" antenna or an induction coil. The term "coil" is intended to refer to a circuit that may wirelessly output or receive energy for coupling to another "coil." The coil may also be referred to as an "antenna" of a type that is configured to wirelessly output or receive power. The coil 352 may be configured to include an air core or a physical core such as a ferrite core (not shown). An air core coil 352 allows the placement of other circuits within the core area. Air core coils may be somewhat susceptible to detuning when certain types of extraneous physical devices are placed in the vicinity of the core. However, an air core may more readily enable placement of the receive coil 218 (FIG. 2) within a plane of the transmit coil 214 (FIG. 2) where the coupled-mode region of the transmit coil 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmitting coil to the receiving coil residing in the neighborhood where this field 105 is established rather than propagating the energy from the transmitting coil into free space.

The resonant frequency of the loop or magnetic coils is based on the inductance and capacitance. Inductance may be simply the inductance created by the coil 352, whereas, capacitance may be added to the coil's inductance to create a resonant structure at a desired resonant frequency. As a non-limiting example, capacitor 354 and capacitor 356 may be added to the transmit or receive circuitry 350 to create a resonant circuit that selects a signal 358 at a resonant frequency. Accordingly, for larger diameter coils, the size of capacitance needed to sustain resonance may decrease as the diameter or inductance of the loop increases. Furthermore, as the diameter of the coil increases, the efficient energy transfer area of the near-field may increase. Other resonant circuits formed using other circuits are also possible. As another non-limiting example, a capacitor may be placed in parallel between the two terminals of the coil 350. For transmit coils, a signal 358 with a frequency that substantially corresponds to the resonant frequency of the coil 352 may be an input to the coil 352.

In one embodiment, the transmitter 104 may be configured to output a time varying magnetic field with a frequency corresponding to the resonant frequency of the transmit coil 114. When the receiver is within the field 105, the time varying magnetic field may induce a current in the receive coil 118. As described above, if the receive coil 118 is configured to be resonant at the frequency of the transmit coil 118, energy may be efficiently transferred. The AC signal induced in the receive coil 118 may be rectified as described above to produce a DC signal that may be provided to charge or to power a load.

Figure 4:
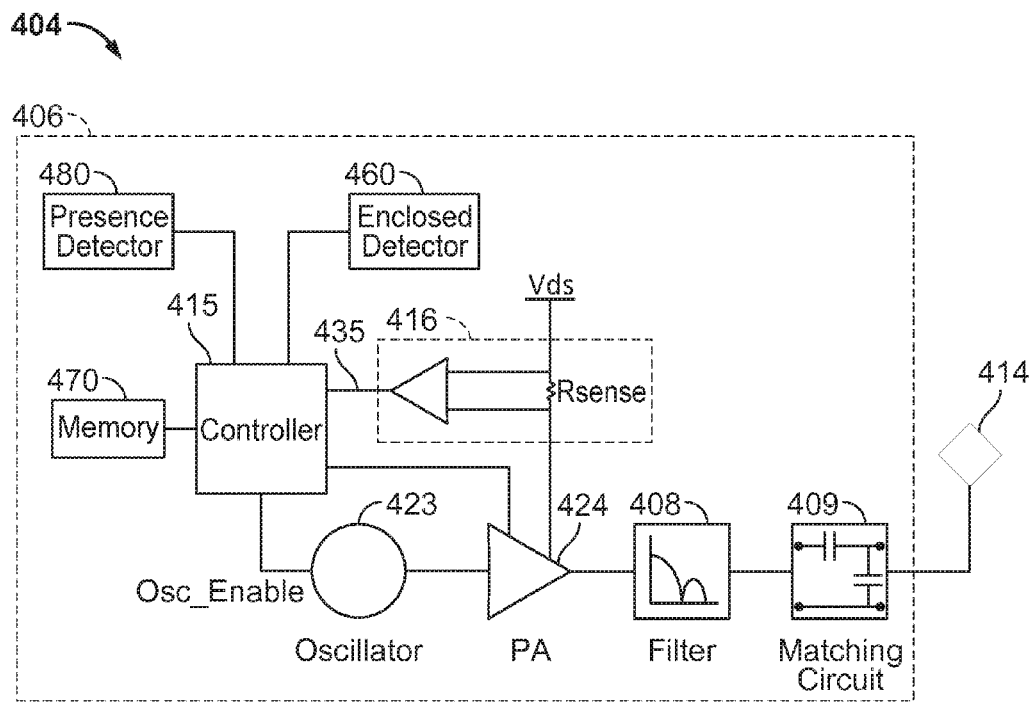
FIG. 4 is a functional block diagram of a transmitter that may be used in the wireless power transfer system of FIG. 1, in accordance with exemplary embodiments of the invention.

FIG. 4 is a functional block diagram of a transmitter 404 that may be used in the wireless power transfer system of FIG. 1, in accordance with exemplary embodiments of the invention. The transmitter 404 may include transmit circuitry 406 and a transmit coil 414. The transmit coil 414 may be the coil 352 as shown in FIG. 3. Transmit circuitry 406 may provide RF power to the transmit coil 414 by providing an oscillating signal resulting in generation of energy (e.g., magnetic flux) about the transmit coil 414. Transmitter 404 may operate at any suitable frequency. By way of example, transmitter 404 may operate at the 13.56 MHz ISM band.

Transmit circuitry 406 may include a fixed impedance matching circuit 409 for matching the impedance of the transmit circuitry 406 (e.g., 50 ohms) to the transmit coil 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the coil 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit coil 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit coil 414. By way of example, a load sensing circuit 416 monitors the current flowing to the driver circuit 424, that may be affected by the presence or absence of active receivers in the vicinity of the field generated by transmit coil 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit coil 414 may be implemented with a Litz wire or as an antenna strip with the thickness, width and metal type selected to keep resistive losses low. In a one implementation, the transmit coil 414 may generally be configured for association with a larger structure such as a table, mat, lamp or other less portable configuration. Accordingly, the transmit coil 414 generally may not need "turns" in order to be of a practical dimension. An exemplary implementation of a transmit coil 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit coil 414 may transmit at a specific frequency. In some cases, these regulations are meant to protect humans from electromagnetic radiation. However, there may be environments where a transmit coil 414 is placed in areas not occupied by humans, or occupied infrequently by humans, such as, for example, garages, factory floors, shops, and the like. If these environments are free from humans, it may be permissible to increase the power output of the transmit coil 414 above the normal power restrictions regulations. In other words, the controller 415 may adjust the power output of the transmit coil 414 to a regulatory level or lower in response to human presence and adjust the power output of the transmit coil 414 to a level above the regulatory level when a human is outside a regulatory distance from the electromagnetic field of the transmit coil 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive coil that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
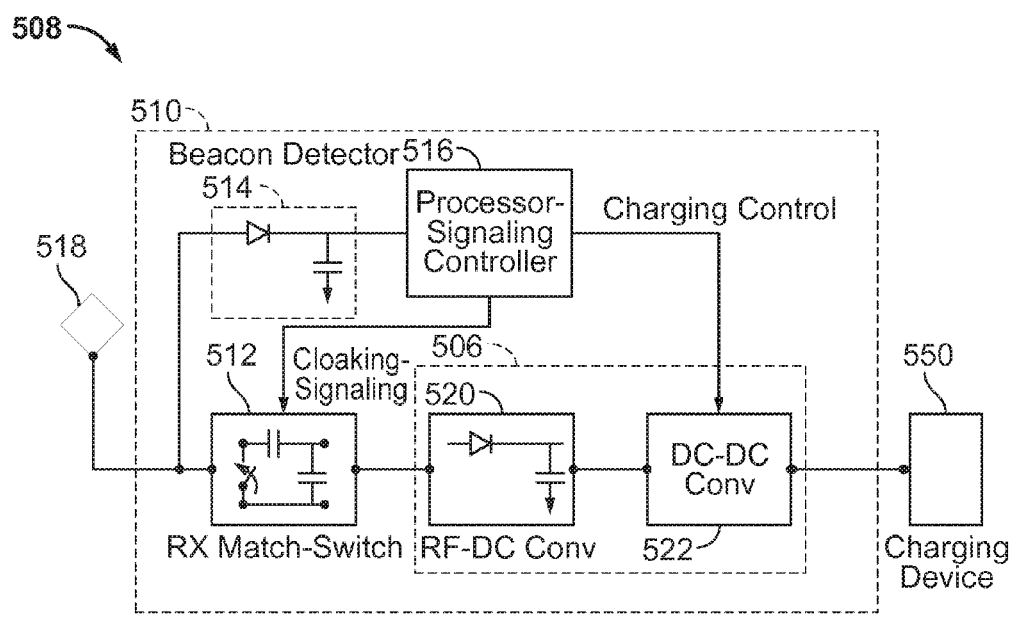
FIG. 5 is a functional block diagram of a receiver that may be used in the wireless power transfer system of FIG. 1, in accordance with exemplary embodiments of the invention.

FIG. 5 is a functional block diagram of a receiver 508 that may be used in the wireless power transfer system of FIG. 1, in accordance with exemplary embodiments of the invention. The receiver 508 includes receive circuitry 510 that may include a receive coil 518. Receiver 508 further couples to device 550 for providing received power thereto. It should be noted that receiver 508 is illustrated as being external to device 550 but may be integrated into device 550. Energy may be propagated wirelessly to receive coil 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (an other medical devices), and the like.

Receive coil 518 may be tuned to resonate at the same frequency, or within a specified range of frequencies, as transmit coil 414 (FIG. 4). Receive coil 518 may be similarly dimensioned with transmit coil 414 or may be differently sized based upon the dimensions of the associated device 550. By way of example, device 550 may be a portable electronic device having diametric or length dimension smaller that the diameter of length of transmit coil 414. In such an example, receive coil 518 may be implemented as a multi-turn coil in order to reduce the capacitance value of a tuning capacitor (not shown) and increase the receive coil's impedance. By way of example, receive coil 518 may be placed around the substantial circumference of device 550 in order to maximize the coil diameter and reduce the number of loop turns (i.e., windings) of the receive coil 518 and the inter-winding capacitance.

Receive circuitry 510 may provide an impedance match to the receive coil 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 522. RF-to-DC converter 520 rectifies the RF energy signal received at receive coil 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive coil 518 to the power conversion circuitry 506 or alternatively for disconnecting the power conversion circuitry 506. Disconnecting receive coil 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive coil 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
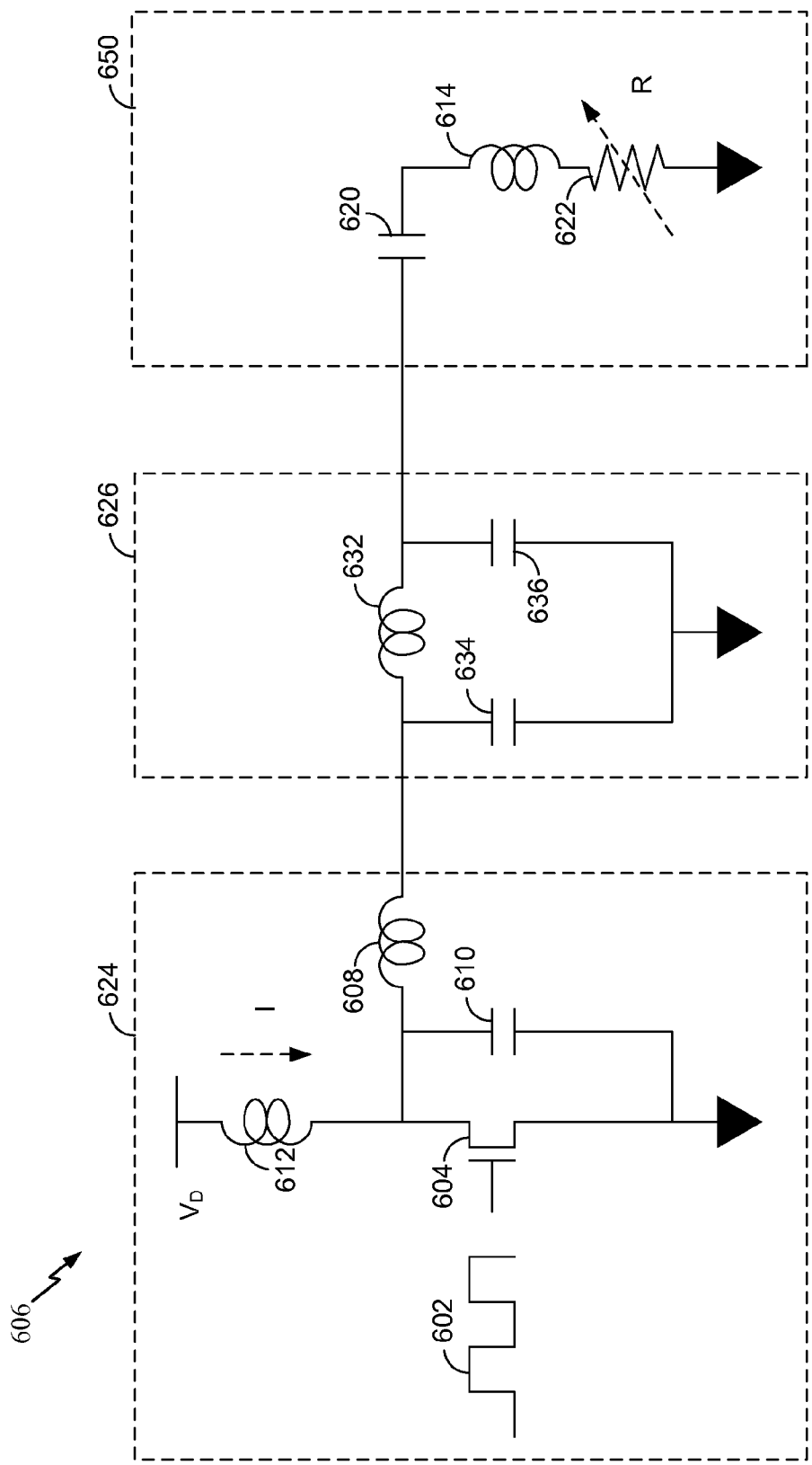
FIG. 6 is a schematic diagram of a portion of transmit circuitry that may be used in the transmit circuitry of FIG. 4.

FIG. 6 is a schematic diagram of a portion of transmit circuitry 606 that may be used in the transmit circuitry 406 of FIG. 4. The transmit circuitry 606 may include a driver circuit 624 as described above in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier; however, any suitable driver circuit 624 may be used in accordance with embodiments of the invention. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 606 may include a filter circuit 626. The filter circuit 626 may be a three pole (capacitor 634, inductor 632, and capacitor 636) low pass filter circuit 626.

The signal output by the filter circuit 626 may be provided to a transmit circuit 650 comprising a coil 614. The transmit circuit 650 may include a series resonant circuit having a capacitance 620 and inductance (e.g., that may be due to the inductance or capacitance of the coil or to an additional capacitor circuit) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

Various exemplary embodiments of the present invention, as described herein, relate to systems, devices, and methods for tuning a resonant frequency of a transmit circuit 650 of the transmit circuitry a transmitter 404 (FIG. 4). According to one exemplary embodiment, a transmit circuit 650 may be configured to selectively include one or more reactive elements for tuning a resonant frequency of the transmitter to a desired frequency. Furthermore, according to another exemplary embodiment, a transmit circuit 650 may inductively couple with one or more parasitic coils (not shown) that may be a part of the transmitter 404 for tuning a resonant frequency of the transmit circuit 650 to a desired frequency. According to yet another exemplary embodiment, a transmit circuit 650 may couple with one or more parasitic coils, where the one or more parasitic coils (mot shown) may include one or more reactive elements, for tuning a resonant frequency of the transmitter 404 to a desired frequency. Additionally, in accordance with another exemplary embodiment, a DC current of a driver circuit 624 of the transmit circuitry 606 may be used to sense a resonant frequency condition of a wireless power system.

Figure 7:
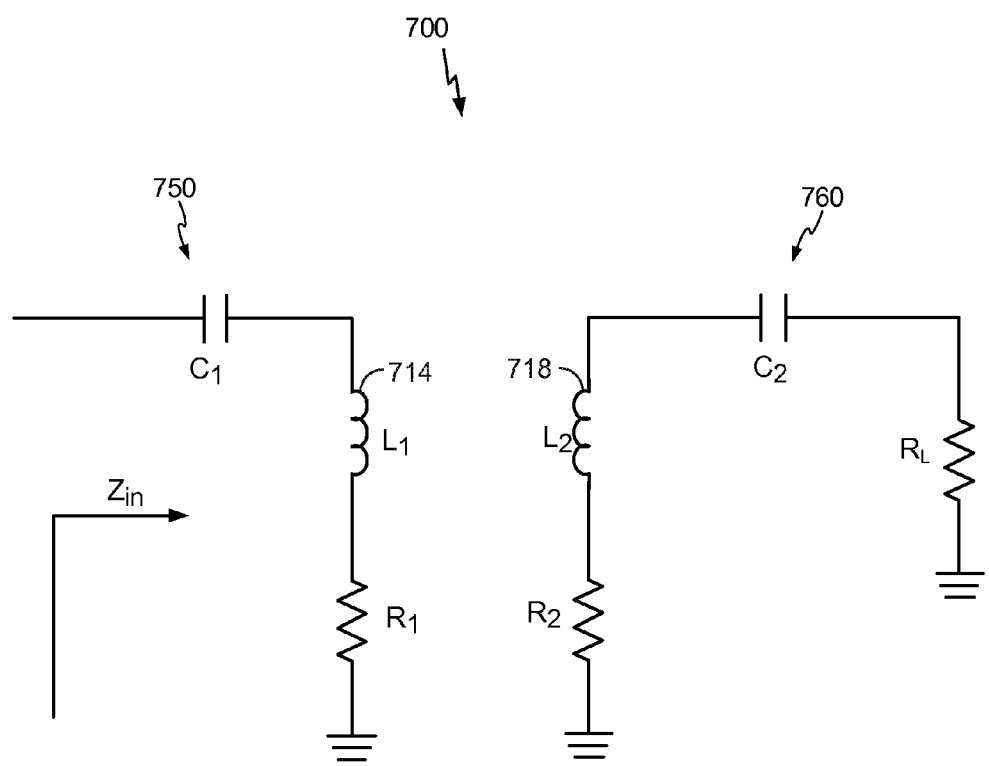
FIG. 7 is a schematic diagram of an exemplary wireless power system including a transmit circuit and a receive circuit, according to an exemplary embodiment of the present invention.

FIG. 7 is schematic diagram of an exemplary wireless power system 700 including a transmit circuit 750 and a receive circuit 760, according to an exemplary embodiment of the present invention. The transmit circuit 750 includes a transmit coil 714 having an inductance $L_1$. A resistor $R_1$ represents a parasitic resistance of the transmit circuit 750. A capacitor $C_1$ may be included (which could be the capacitance of the transmit coil 714 in some embodiments) and may be used to tune the transmit circuit 750 for resonance matching purposes. By way of example only, capacitor $C_1$ may comprise a capacitance of 27.8 pF, transmit coil 714 may have an inductance $L_1$ of 5 µH, and the parasitic resistance $R_1$ may be 5 ohms. The receive circuit 760 includes a receive coil 718 having an inductance $L_2$ and a parasitic resistance (i.e., resistor $R_2$). The receive coil 718 may also be tuned by a capacitor $C_2$ of the receive circuit 760 which may be coupled to a load, which is represented by resistor $R_L$. By way of example only, capacitor $C_2$ may comprise a capacitance of 27.8 pF, the receive coil 718 may have an inductance $L_2$ of 5 µH, and the parasitic resistance $R_2$ may be 5 ohms. The frequency of the signal used to drive the transmit circuit 750 may be 13.56 MHz. As described above, the transmit circuit 750 and the receive circuit 750 may be configured to resonate at a particular frequency. Equation 1 below shows the relationship between the frequency and values of the capacitance $C_1$ and inductance $L_1$ at resonance.

$$j\omega L_1 = \frac{1}{j\omega C_1}; \quad \text{Equation 1}$$

where ω is the frequency in radians. The impedance ($Z_{in}$) presented to the transmit coil 714 may be given by Equation 2 below:

$$Z_{in} = R_1 + \frac{(M\omega)^2}{R_2 + R_L} \quad \text{Equation 2}$$

where M is the mutual inductance between transmit coil 714 and receive coil 718, ω is the frequency in radians, and $R_L$, is the load.

While transferring power, various operating conditions may prevent the transmit circuit 750 from resonating at a particular operating frequency. For example, the presence of metal objects and the presence of a different number of wireless power receivers may alter the impedance as presented to the transmit coil 714 and effectively change the resonant frequency of the transmit circuit 750. In this case, as the frequency of the signal driving the transmit circuit 750 may be unchanged, the signal frequency may no longer be the same as the altered resonant frequency of the transmit circuit 750. The presence of a variable number of wireless power receivers with different power requirements may also adjust the impedance presented to the transmit circuit 750 and alter the resonant frequency of the transmit circuit 750. Besides lowering the amount of power that may be wirelessly transferred, operating off resonance may decrease the efficiency of a driver circuit 624 used to drive the transmit circuit 750. This may reduce system efficiency, increase thermal dissipation, and may increase charge times when a transmitter is used to wirelessly charge a rechargeable battery. As such methods and systems that efficiently and inexpensively tune the circuits of the transmit circuit 750 so that the transmit circuit 750 may resonate despite changes in the resonant frequency are desirable.

Figure 8:
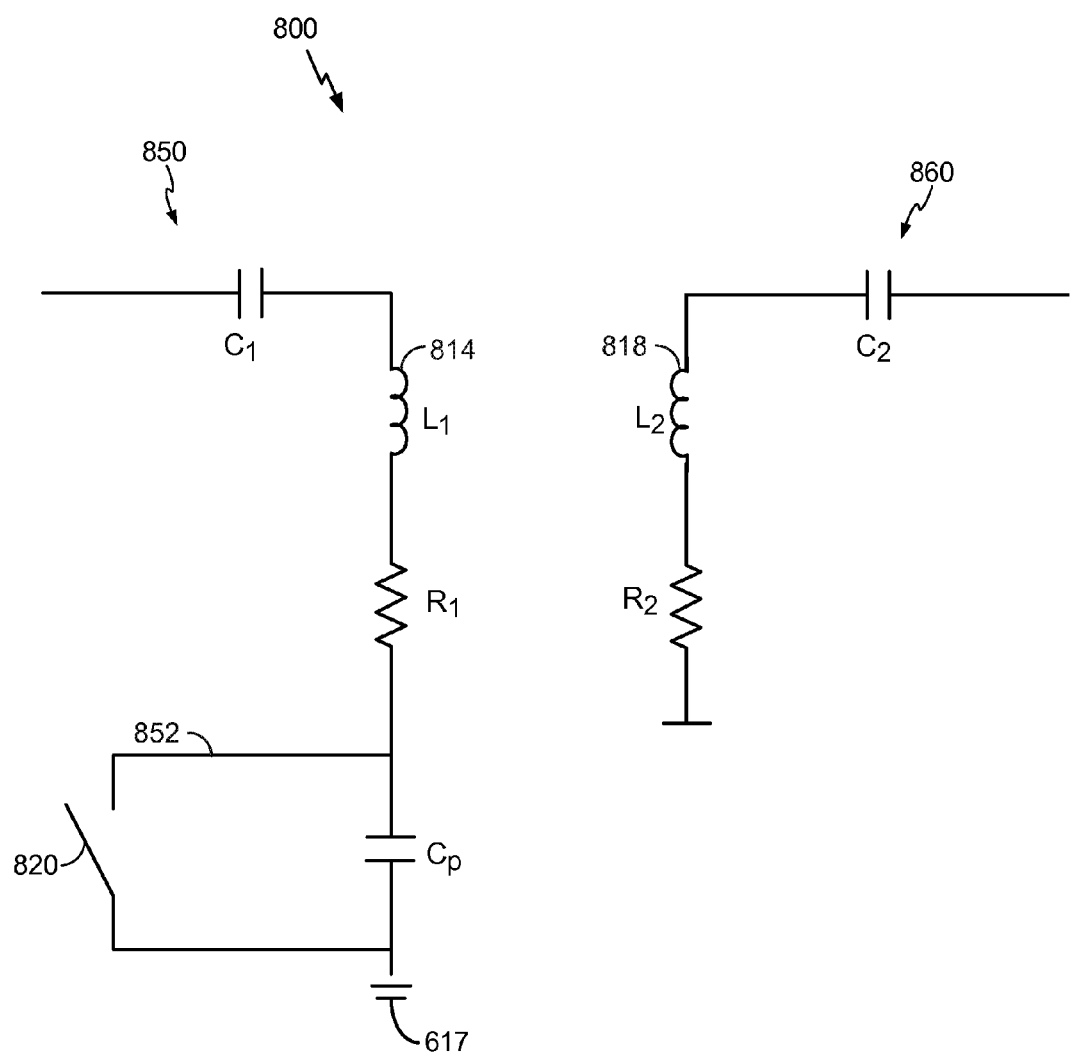
FIG. 8 is a schematic diagram of the wireless power system of FIG. 7 including an exemplary tuning circuit, according to an exemplary embodiment of the present invention.

FIG. 8 is a schematic diagram of the wireless power system 800 of FIG. 7 with an exemplary tuning circuit 852, according to an exemplary embodiment of the present invention. The wireless power system 800 includes a receive circuit 860 having a receive coil 818 having an inductance $L_2$ and a resistance $R_2$. The receive coil 818 may be tuned by a capacitor $C_2$ to resonate at a particular frequency. The wireless power system 800 also includes a transmit circuit 850 having a transmit coil 814. The transmit coil 814 has an inductance $L_1$ and resistance $R_1$, and may be tuned by capacitor $C_1$ such that it may resonate at a particular frequency. Furthermore, the transmit circuit 850 may include a tuning circuit 852 including a reactive element (i.e., a capacitor $C_p$) coupled between the transmit coil 814 and ground reference voltage 617. Moreover, reactive element $C_p$ is in parallel with a switch 820. It is noted that the term "switch" may comprise any suitable and known switching element. While switch 820 is closed, the reactive element $C_p$ may be shorted and not contribute to the impedance presented to the transmit circuit 850. As such, the impedance ($Z_{in}$) presented to the transmit coil 814 may be given by Equation 3 which is similar to Equation 2:

$$Z_{in} = R_1 + \frac{(M\omega)^2}{(R_2 + R_L)}; \quad \text{Equation 3}$$

where M is the mutual inductance between transmit coil 814 and receive coil 818, ω is the frequency in radians, and $R_L$, is the load of receiver 808.

When the switch 820 is open, the reactive element $C_p$ will contribute to the impedance presented to the transmit coil 814 and the impedance ($Z_{in}$) looking into the transmitting coil may be given by Equation 4:

$$Z_{in} = Z_{ino} + \frac{1}{j\omega C_P};\qquad \text{Equation 4}$$

where $Z_{ino}$ is the impedance looking into the transmitting coil while switch is closed as given by Equation 3. As such, controlling the switch 820 allows the tuning circuit 852 to adjust the impedance presented to the transmit circuit 850. Adjusting the impedance adjusts the reactance (i.e., adds capacitance to the transmit circuit 850) such that the resonant frequency is also adjusted as given by Equation 1. If it is detected that the transmit circuit 850 is off-resonance, the switch 820 may be opened and the adjusted impedance may tune the resonant frequency around the desired frequency (i.e., match the resonant frequency to the frequency of the signal provided at the output of the driver circuit 624 (FIG. 6)). In some cases, it may be beneficial to position the switch at the center tap of the transmit coil 814 to improve gate drive and for a balanced transmit coil 814 structure.

By way of example only, for a two percent (2%) change in the impedance ($Z_{in}$) looking into the transmitting coil, capacitor $C_p$ may be equal to fifty times the values of capacitor $C_1$ (i.e., $C_p=50*C_1$). A series of additional reactive elements (not shown) with switches in parallel may be added to the tuning circuit 852 for additional tuning control such that the reactance may be tuned over a range of possible resonant frequencies. Selectively switching in and out different reactive elements may allow for fine tuning the transmit circuit 850 to resonate using a desired frequency over a wide range of impedances presented to the transmit coil 814.

Figure 9A:
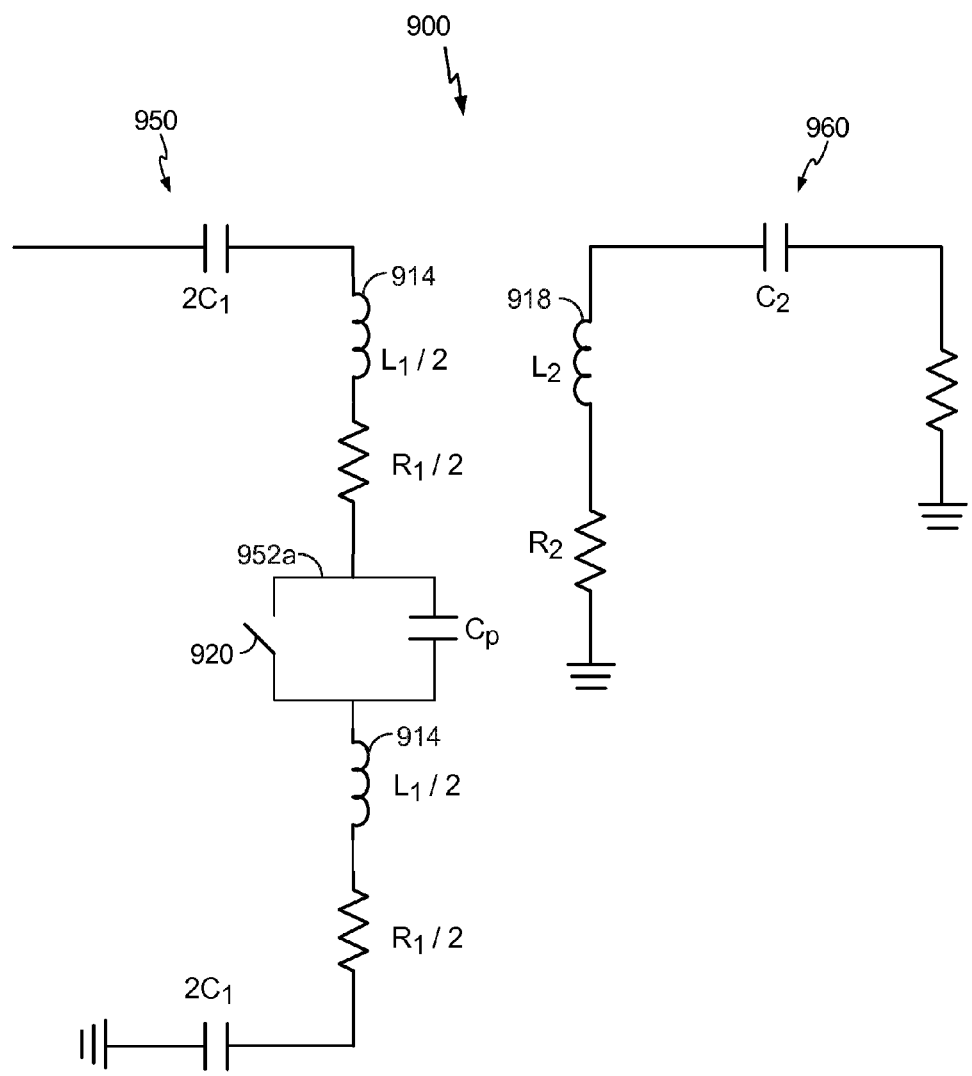
FIGS. 9A and 9B are schematic diagrams of the wireless power system of FIG. 7 including exemplary tuning circuits located at the center tap of a transmit coil, according to exemplary embodiments of the present invention.
Figure 9B:
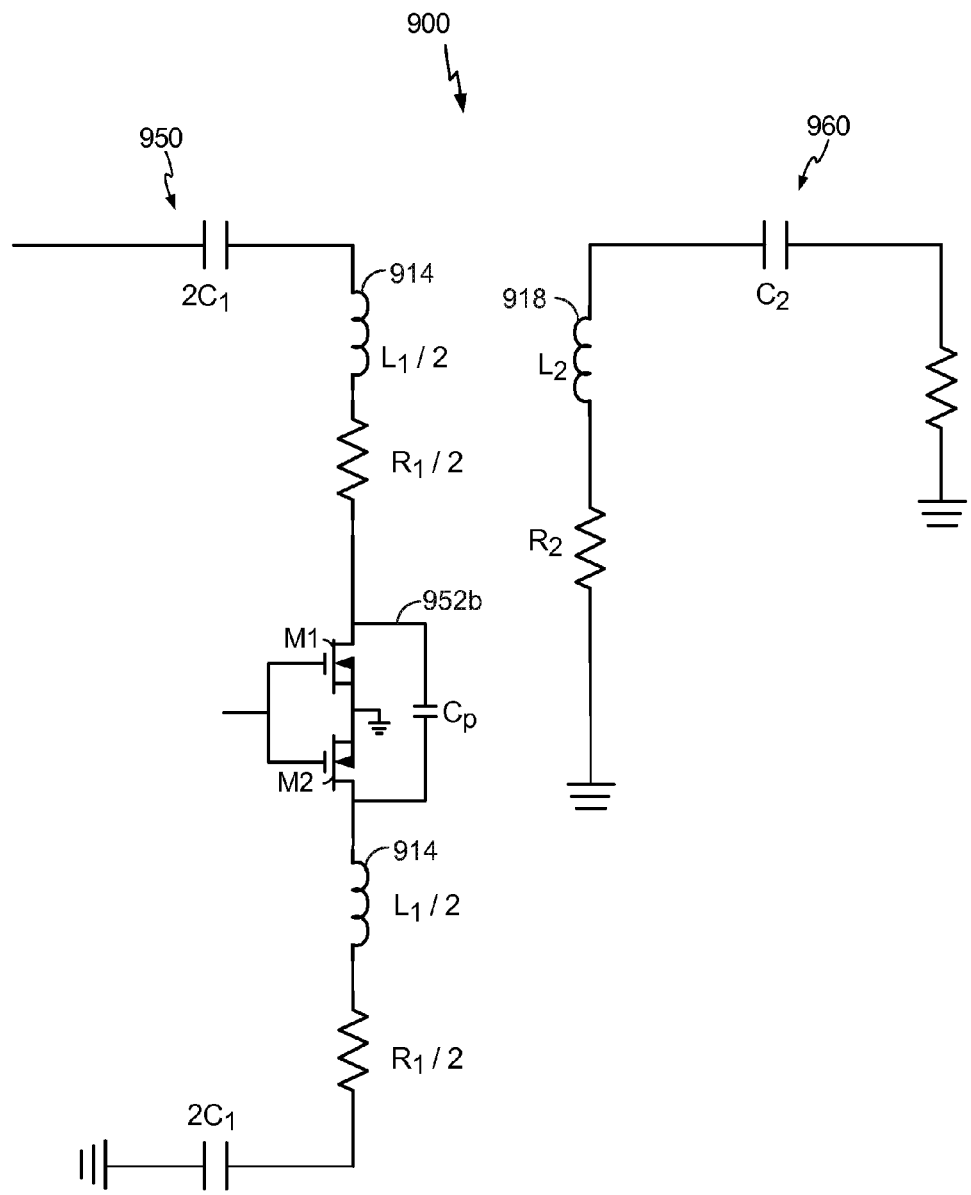

FIGS. 9A and 9B are schematic diagrams of the wireless power system of FIG. 7 including exemplary tuning circuits 952a and 952b located at the center tap of a transmit coil 914, according to exemplary embodiments of the present invention. In FIGS. 9A and 9B tuning circuits 952a and 952b are placed such that half of the inductance $L_1$ and half of the parasitic resistance $R_1$ are on either side of the tuning circuits 952a and 952b. In addition, capacitors with twice the capacitance of the capacitor $C_1$ of FIG. 8 may be placed on either side of the transmit coil 914 for a balanced configuration. FIG. 9A shows a tuning circuit 952a including a reactive element $C_p$ in parallel with a switch 920 or relay. The resistance of the relay 902 may be low such that when the switch is closed, the reactive element $C_p$ is effectively shorted and does not contribute to the impedance presented to the transmit coil 914. FIG. 9B shows a tuning circuit 952b including dual field effect transistors (FETs) M1 and M2 in parallel with the reactive element $C_p$. A virtual ground at the center of the transmit coil 714 provides a common ground reference when switching using dual FETs M1 and M2. As will be further described below, the drain-to-source capacitance of the FETs M1 and M2 may be taken into account.

Figure 10C:
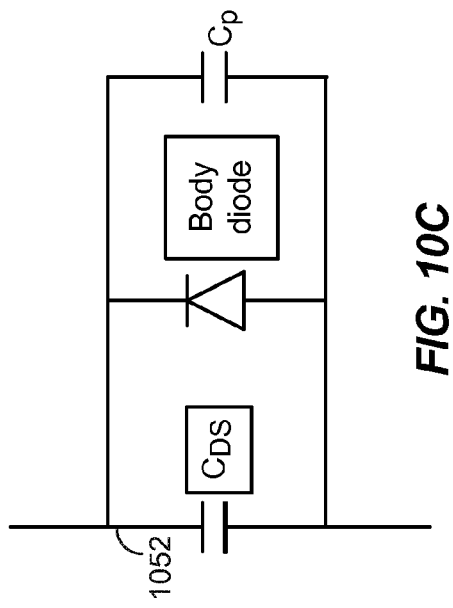
FIGS. 10A, 10B, and 10C are schematic diagrams of an exemplary tuning circuit shown in various operating states that may be used in the wireless power system of FIG. 8, according to exemplary embodiments of the present invention.
Figure 10A:
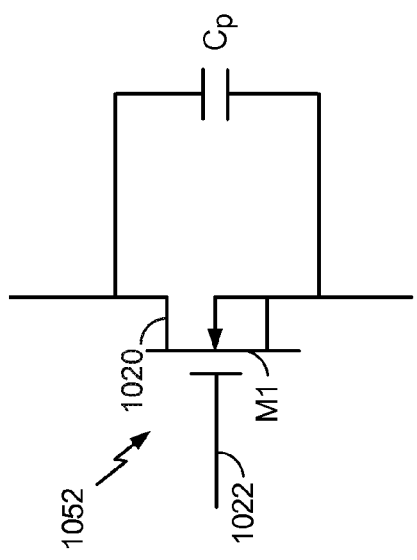
Figure 10B:
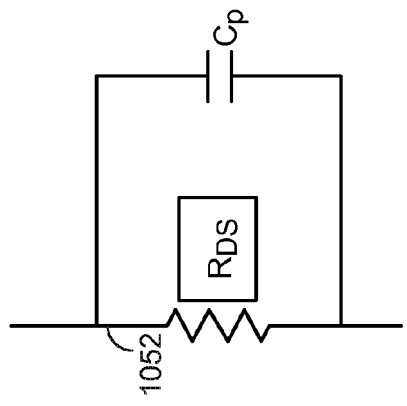

FIGS. 10A, 10B, and 10C are schematic diagrams of an exemplary tuning circuit 1052 shown in various operating states that may be used in the wireless power system 800 of FIG. 8, according to exemplary embodiments of the present invention. FIG. 10A shows a tuning circuit 1052 including switch 1020 that includes a transistor M1 having a drain coupled to one side of reactive element $C_p$, a source coupled to another side of reactive element $C_p$, and a gate coupled to a control signal 1022. FIG. 10B shows a partial schematic representation of the tuning circuit 1052 while switch 1020 is in a closed configuration where a resistance $R_{DS}$ is the drain-to-source resistance of transistor M1. FIG. 10C illustrates a partial schematic representation of the tuning circuit 1052 while switch 620 is in an open configuration illustrating a body diode and a capacitance $C_{DS}$, which is the drain-to-source capacitance of transistor M1. As an illustration, assuming, for example only, with a peak voltage of switch 620 (i.e., the transistor) at 0.7 volts, and with switch 620 open, Equations 5, 6, and 7 show the voltage, current and power as a result of the tuning circuit 1052 operation:

$$V_{C_p}=V_{FET}=0.7V_{peak}=0.5V_{rms};\qquad \text{Equation 5}$$

$$I_{IN}=V_{C_p}/X_{C_p}=0.059A_{rms};\qquad \text{Equation 6}$$

$$P_{load}=I_{IN}*I_{IN}*Z_{IN}=0.059W_{rms}.\qquad \text{Equation 7}$$

A body diode of transistor M1 may conduct at higher power and, therefore, reactive element $C_p$ may be shorted out. Accordingly, a single transistor (i.e., a single FET) may, depending on circuit variables, may be suited for lower power (e.g., 0.0625 W). As shown in FIGS. 10A, 10B, and 10C, a single transistor configuration may be used for lower power system configurations.

Figure 11C:
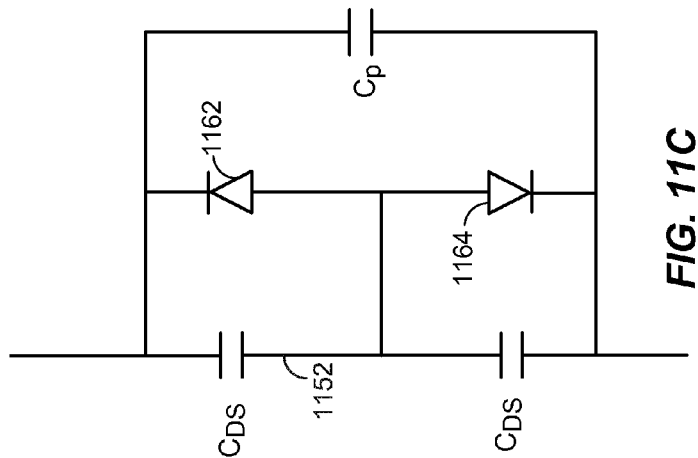
FIGS. 11A, 11B, and 11C are schematic diagrams of another exemplary tuning circuit shown in operating various states that may be used in the wireless power system of FIG. 8, according to exemplary embodiments of the present invention.
Figure 11A:
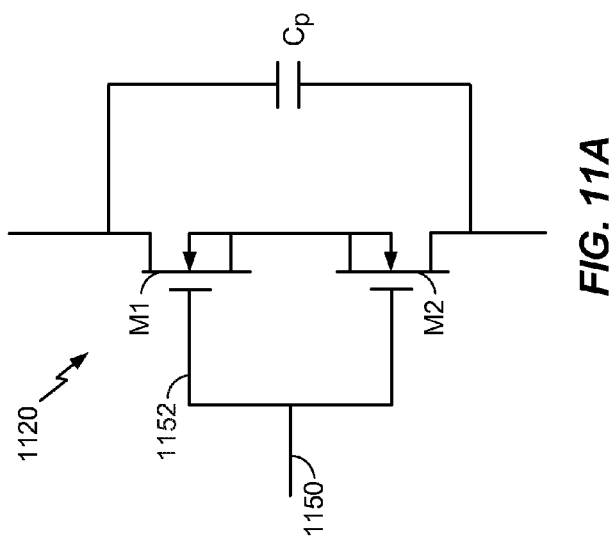
Figure 11B:
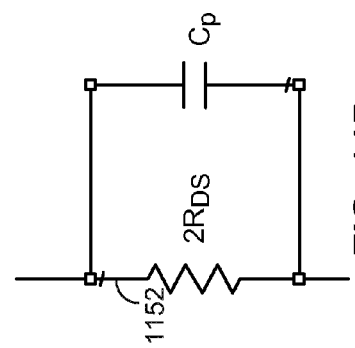

FIGS. 11A, 11B, and 11C are schematic diagrams of another exemplary tuning circuit 1152 shown in various operating states that may be used in the wireless power system 800 of FIG. 8, according to exemplary embodiments of the present invention. FIG. 11A shows a tuning circuit 1152 comprising two transistors M1 and M2 (e.g., FETs). This tuning circuit 1152 may be used for systems that may require higher power. More specifically, a switch 1120 may include a first transistor M1 having a drain coupled to one side of reactive element $C_p$ and a source coupled to a source of a second transistor M2. Furthermore, second transistor M2 has a drain coupled to another side of reactive element $C_p$. Each of first transistor M1 and second transistor M2 has a gate coupled to a control signal 1150. FIG. 11B illustrates a partial schematic representation of tuning circuit 1152 while the switch 1120 is in a closed configuration (i.e., transistors M1 and M2 are both closed) where a resistance $2R_{DS}$ is the drain-to-source resistance of transistor M1 combined with the drain-to-source resistance of transistor M2. FIG. 11C illustrates a partial schematic representation of the tuning circuit 1152 while the switch 1120 is in an open configuration (i.e., transistors M1 and M2 are both open). The schematic of FIG. 9C includes body diodes 1162 and 1164, one for each transistor M2 and M3, and two drain-to-source capacitances $C_{DS}$, one for each transistor M2 and M3. As another illustration, and assuming $V_{C_{DS}}=0.7V_{peak}=0.5V_{rms}$, Equations 8, 9, and 10 show the voltage, current and power as a result of the tuning circuit 1152 operation when the switch 1120 is open:

$$V_{C_p}=2*V_{C_{DS}}=1.0V_{rms};\qquad \text{Equation 8}$$

$$I_{IN}=I_{C_p}=V_{CP}/X_{C_p}=0.118A;\qquad \text{Equation 9}$$

$$P_{load}=I_{IN}*I_{IN}*Z_{IN}=0.237W_{rms}.\qquad \text{Equation 10}$$

Voltage peaks may still cause a body diode of the transistors to conduct, however, only capacitance $C_{DS}$ may be shorted out, rather than reactive element $C_p$.

In various embodiments, certain aspects of the dynamic tuning discussed above with respect to FIGS. 8-11C can cause harmonic distortion and/or spurious emissions. For example, the transistors M1 and M2 can present significant drain-to-source capacitances $C_{DS}$ in the open configuration, as discussed above with respect to FIGS. 10C and 11C. Moreover, this effective output capacitance, which is parallel to the tuning capacitances $C_P$, can change based on the voltage across the transistors M1 and M2. In various embodiments, the voltage across the transistors M1 and M2 can be proportional to the current traveling through the transmission path. In some embodiments, a change in output capacitance $C_{DS}$ can distort the AC waveform, introducing "noise" into the signal. As used herein, "noise" can refer specifically to harmonic distortion and/or spurious emissions associated therewith.

Figure 12:
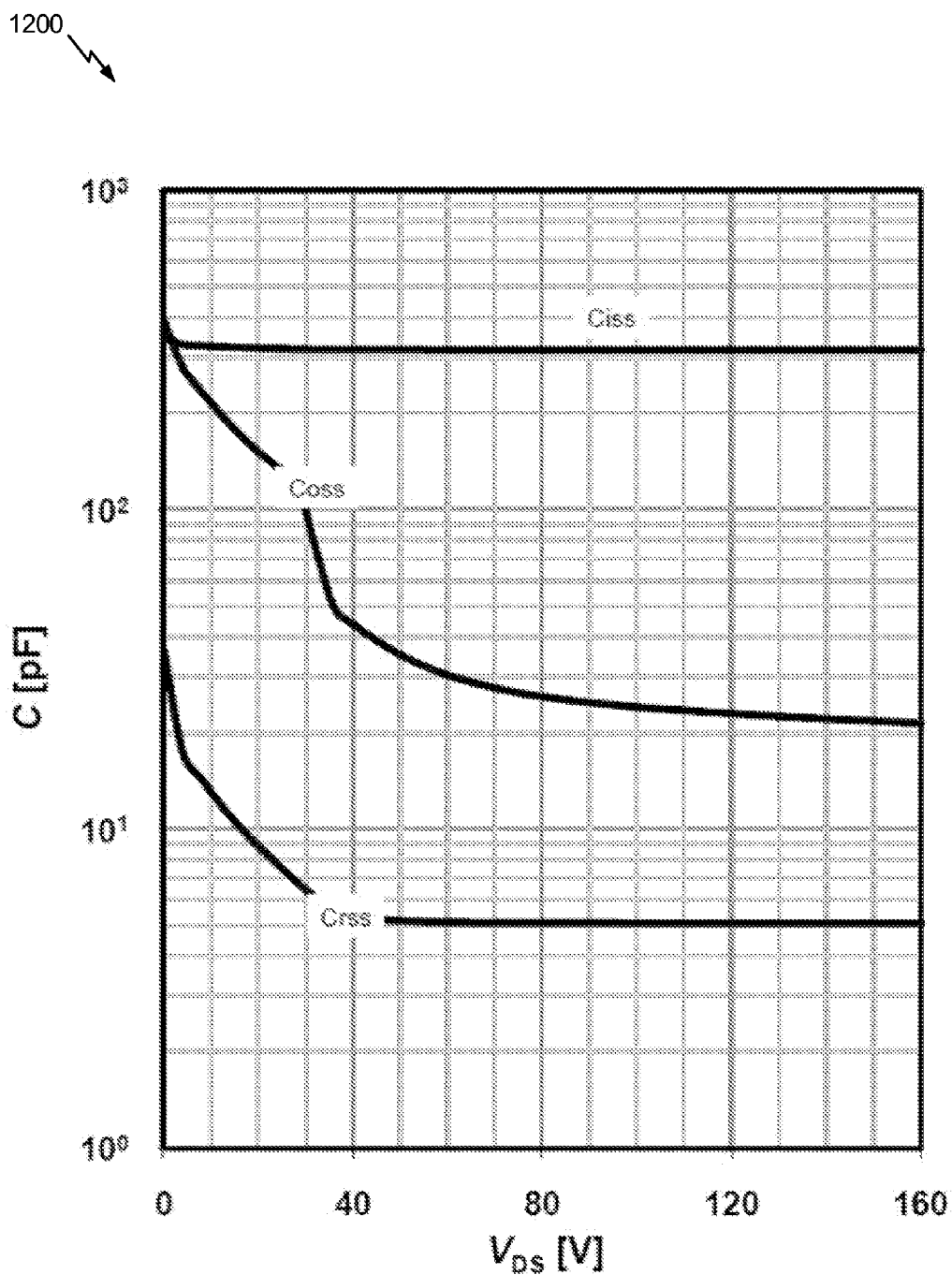
FIG. 12 shows an exemplary graph of transistor capacitance as a function of input voltage.

FIG. 12 shows an exemplary graph 1200 of transistor capacitance as a function of input voltage. Particularly, the graph 1200 shows drain-source voltage $V_{DS}$ (in Volts) on the x-axis and capacitance C (in pF) on the y-axis. The graph 1200 includes shows input capacitance Ciss, output capacitance Coss, and reverse transfer capacitance Crss. As shown in FIG. 12, the output capacitance Coss of an exemplary transistor (such as the transistors M1 and M2 discussed above with respect to FIGS. 8-11C) can vary by orders of magnitude across input voltages $V_{DS}$ between 0 and 160 V.

In some embodiments, the transmit circuit (for example, transmit circuits 406, 606, 750, 850, and/or 950 described above with respect to FIGS. 4, 6, and 7-9 respectively) can be configured as a differential transmit circuit. For example, the transmit circuit can include a differential power amplifiers and/or a differential transmit path. In some embodiments, waveforms on both sides (for example, a positive signal line and a negative signal line) of an ideal continuous wave (CW) differential power amplifier (PA) can be pure sinusoidal inverses of each other.

In various embodiments, the power amplifier can experience differential mode noise and/or common mode noise. Differential mode noise can include operation in which the two sides remain inverse, but the waveform is perturbed so that it is no longer sinusoidal. Common mode can include operation in which the two sides are no longer inverse, but have common varying circuits relative to ground.

In some embodiments, differential noise can cause a problem in near field signals. In some embodiments, differential noise can be canceled out in far field signals. On the other hand, common mode noise might not be canceled out. Accordingly, common mode noise can cause a problem in both near and far field emissions. In some embodiments, the center of the loads L1 can be grounded, which can cause the waveform to be more symmetrical. In some embodiments, however, common mode current will be driven directly into ground, which can cause a loss in power that can present a higher load resistance. Thus, some embodiments having grounded center-tapped loads can experience reduced efficiency due to common mode current.

In some embodiments, one or more tuning circuits (such as the tuning circuits 852, 952a, 952b, 1052, and/or 1152, described above with respect to FIGS. 8-11C respectively) can be implemented as symmetrical tuning stages. The tuning circuits 852, 952a, 952b, 1052, and/or 1152 can be implemented as differential circuits. Although differential symmetrical tuning circuits will be described herein, a person having ordinary skill in the art will appreciate that the symmetrical tuning circuits can be implemented in a single-ended configuration. Moreover, any single-ended circuits described herein can be implemented in a differential configuration for interoperability with the differential symmetrical tuning circuits.

Figure 13A:
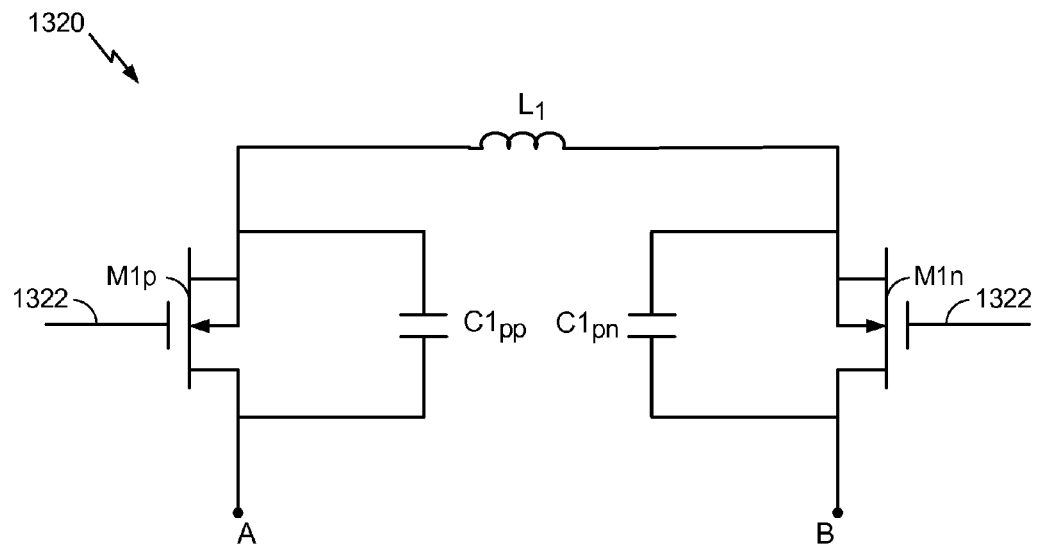
FIGS. 13A-13B are schematic diagrams of an exemplary tuning circuit that may be used in the wireless power system of FIG. 8, according to exemplary embodiments of the present invention.
Figure 13B:
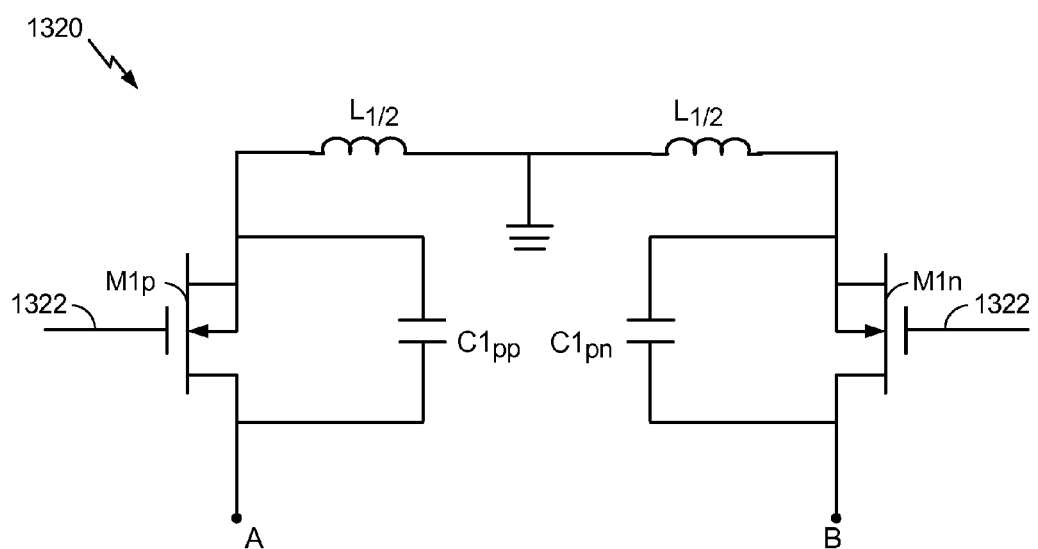

FIGS. 13A-13B are schematic diagrams of an exemplary tuning circuit 1320 that may be used in the wireless power system 800 of FIG. 8, according to exemplary embodiments of the present invention. Although various circuits are shown in an exemplary configuration, a person having ordinary skill in the art will appreciate that one or more circuits shown can be rearranged or omitted, and additional circuits not shown can be added. Moreover, although the tuning circuit 1320 is shown in a differential configuration, aspects of the tuning circuit 1320 can also apply to a single-ended configuration.

FIG. 13A shows a symmetrical differential tuning circuit 1320 including a first transistor M1$p$, a second transistor M1$n$, a first reactive element $C1_{pp}$, a second reactive element $C1_{pn}$, and a load L1. The tuning circuit 1320 is configured to receive a control signal 1322, a positive differential signal line A, and a negative differential signal line B. As shown, a first switch includes the transistor M1$p$ having a drain coupled to one side of the first reactive element $C1_{pp}$ and to a positive differential signal input A, a source coupled to a second side of the first reactive element $C1_{pp}$ and to a first end of a load L1, and a gate coupled to a control signal 1322. A second switch includes the transistor M1$n$ having a drain coupled to one side of the first reactive element $C1_{pp}$ and to a negative differential signal input B, a source coupled to a second side of the first reactive element $C1_{pp}$ and to a second end of a load L1, and a gate coupled to the control signal 1322.

In some embodiments, the symmetrical differential tuning circuit 1320 shown in FIG. 13A can be a perfectly symmetrical switching stage with no center tap. The transistors M1$p$ and M1$n$ can be configured to have opposite currents running through them at any given moment. Accordingly, while the first transistor M1$p$ experiences its maximum drain-source voltage (and therefore minimum open-state capacitance), the second transistor M1$n$ can experience its minimum drain-source voltage (and therefore maximum open-state capacitance). In some embodiments, the imbalance between open-state capacitance can cause an imbalance which can manifests as common mode noise. In some embodiments, the configuration of FIG. 13A can reduce differential mode noise because capacitance in each transistor M1$p$ and M1$n$ are inversely related. Thus, in some embodiments, the transistor M1$n$ can generate, cause, or create a harmonic that at least partially cancels a harmonic generated, caused, or created by the transistor M1$p$, and vice versa. In some cases the transistor M1$n$ does not generate, cause, or create a harmonic, that it otherwise would in the absence of the configuration shown in FIG. 13A, for example, by virtue of the configuration of the transistor M1$p$, and vice versa.

FIG. 13B shows a symmetrical differential tuning circuit 1320 including a first transistor M1$p$, a second transistor M1$n$, a first reactive element $C1_{pp}$, a second reactive element $C1_{pn}$, and a load L1 with a center tap to ground. The tuning circuit 1320 is configured to receive a control signal 1322, a positive differential signal line A, and a negative differential signal line B. As shown, a first switch includes the transistor M1$p$ having a drain coupled to one side of the first reactive element $C1_{pp}$ and to a positive differential signal input A, a source coupled to a second side of the first reactive element $C1_{pp}$ and to a first end of a load L1, and a gate coupled to a control signal 1322. A second switch includes the transistor M1$n$ having a drain coupled to one side of the first reactive element $C1_{pp}$ and to a negative differential signal input B, a source coupled to a second side of the first reactive element $C1_{pp}$ and to a second end of a load L1, and a gate coupled to the control signal 1322.

In some embodiments, the symmetrical differential tuning circuit 1320 shown in FIG. 13B can be a perfectly symmetrical switching stage with a center tap. The transistors M1p and M1n can be configured to have opposite currents running through them at any given moment. Accordingly, while the first transistor M1p experiences its maximum drain-source voltage (and therefore minimum open-state capacitance), the second transistor M1n can experience its minimum drain-source voltage (and therefore maximum open-state capacitance). In some embodiments, the imbalance between open-state capacitance can cause an imbalance which can manifests as common mode noise. The center tap can reduce this common mode noise, but can introduce a higher effective resistance due to power dissipated through the center tap. In some embodiments, the configuration of FIG. 13B can reduce differential mode noise because capacitance in each transistor M1p and M1n are inversely related. Thus, in some embodiments, the transistor M1n can generate, cause, or create a harmonic that at least partially cancels a harmonic generated, caused, or created by the transistor M1p, and vice versa. In some cases the transistor M1n does not generate, cause, or create a harmonic, that it otherwise would in the absence of the configuration shown in FIG. 13B, for example, by virtue of the configuration of the transistor M1p, and vice versa.

Figure 14A:
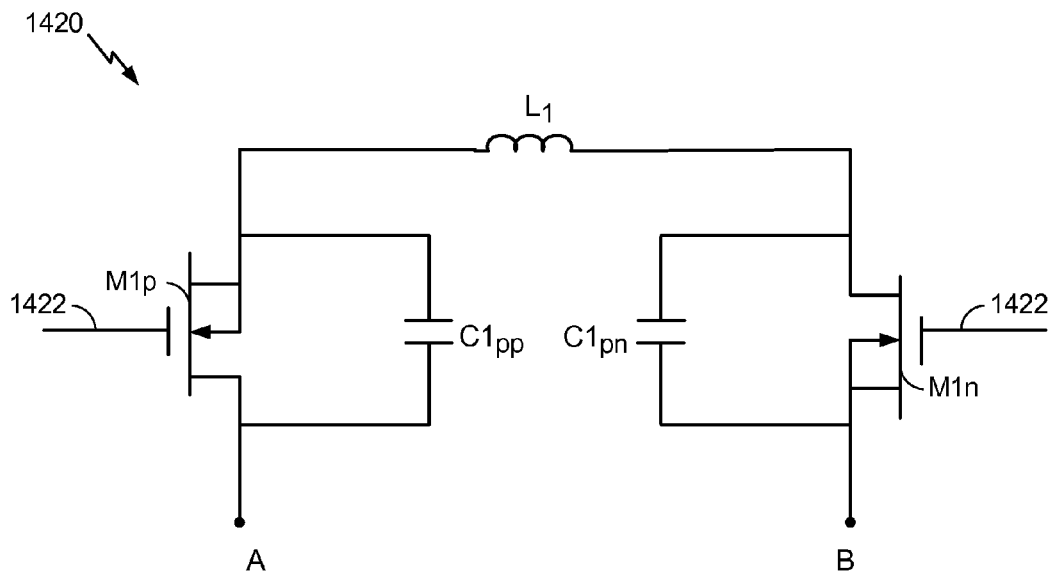
FIGS. 14A-14B are schematic diagrams of another exemplary tuning circuit that may be used in the wireless power system of FIG. 8, according to exemplary embodiments of the present invention.
Figure 14B:
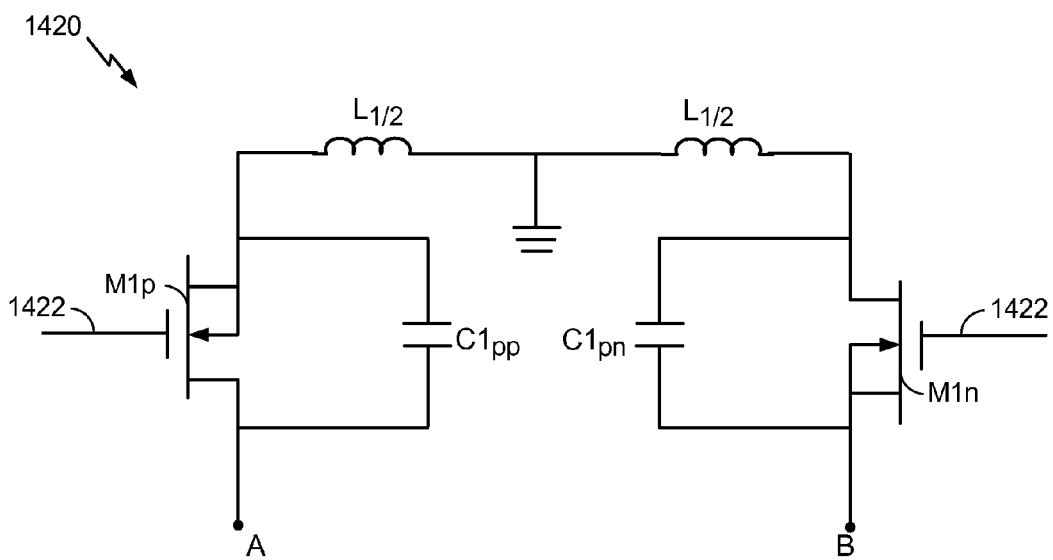

FIGS. 14A-14B are schematic diagrams of another exemplary tuning circuit 1420 that may be used in the wireless power system 800 of FIG. 8, according to exemplary embodiments of the present invention. Although various circuits are shown in an exemplary configuration, a person having ordinary skill in the art will appreciate that one or more circuits shown can be rearranged or omitted, and additional circuits not shown can be added. Moreover, although the tuning circuit 1320 is shown in a differential configuration, aspects of the tuning circuit 1420 can also apply to a single-ended configuration.

FIG. 14A shows a symmetrical differential tuning circuit 1420 including a first transistor M1p, a second transistor M1n, a first reactive element $C1_{pp}$, a second reactive element $C1_{pn}$, and a load L1. The tuning circuit 1420 is configured to receive a control signal 1422, a positive differential signal line A, and a negative differential signal line B. As shown, a first switch includes the transistor M1p having a drain coupled to one side of the first reactive element $C1_{pp}$ and to a positive differential signal input A, a source coupled to a second side of the first reactive element $C1_{pp}$ and to a first end of a load L1, and a gate coupled to a control signal 1422. A second switch includes the transistor M1n having a source coupled to one side of the first reactive element $C1_{pp}$ and to a negative differential signal input B, a drain coupled to a second side of the first reactive element $C1_{pp}$ and to a second end of a load L1, and a gate coupled to the control signal 1422.

In some embodiments, the symmetrical differential tuning circuit 1420 shown in FIG. 14A can be a modification of the tuning circuit 1320 shown in FIG. 13A, wherein the second transistor M1n has been reversed. Accordingly, the transistors M1p and M1n can be configured to have the same currents running through them at any given moment. Thus, while the first transistor M1p experiences its maximum drain-source voltage (and therefore minimum open-state capacitance), the second transistor M1n can also experience its maximum drain-source voltage (and therefore minimum open-state capacitance), and vice versa. In some embodiments, the balance between open-state capacitance can decrease common mode noise. Thus, in some embodiments, the transistor M1n can generate, cause, or create a harmonic that at least partially cancels a harmonic generated, caused, or created by the transistor M1p, and vice versa. In some cases the transistor M1n does not generate, cause, or create a harmonic, that it otherwise would in the absence of the configuration shown in FIG. 14A, for example, by virtue of the configuration of the transistor M1p, and vice versa. In some embodiments, the configuration of FIG. 14A can increase differential mode noise.

FIG. 14B shows a symmetrical differential tuning circuit 1420 including a first transistor M1p, a second transistor M1n, a first reactive element $C1_{pp}$, a second reactive element $C1_{pn}$, and a load L1 with a center tap to ground. The tuning circuit 1420 is configured to receive a control signal 1422, a positive differential signal line A, and a negative differential signal line B. As shown, a first switch includes the transistor M1p having a drain coupled to one side of the first reactive element $C1_{pp}$ and to a positive differential signal input A, a source coupled to a second side of the first reactive element $C1_{pp}$ and to a first end of a load L1, and a gate coupled to a control signal 1422. A second switch includes the transistor M1n having a source coupled to one side of the first reactive element $C1_{pp}$ and to a negative differential signal input B, a drain coupled to a second side of the first reactive element $C1_{pp}$ and to a second end of a load L1, and a gate coupled to the control signal 1422.

In some embodiments, the symmetrical differential tuning circuit 1420 shown in FIG. 14B can be a modification of the tuning circuit 1420 shown in FIG. 13A, with a center tap. Accordingly, the transistors M1p and M1n can be configured to have the same currents running through them at any given moment. Thus, while the first transistor M1p experiences its maximum drain-source voltage (and therefore minimum open-state capacitance), the second transistor M1n can also experience its maximum drain-source voltage (and therefore minimum open-state capacitance), and vice versa. In some embodiments, the balance between open-state capacitance can decrease common mode noise. Thus, in some embodiments, the transistor M1n can generate, cause, or create a harmonic that at least partially cancels a harmonic generated, caused, or created by the transistor M1p, and vice versa. In some cases the transistor M1n does not generate, cause, or create a harmonic, that it otherwise would in the absence of the configuration shown in FIG. 14B, for example, by virtue of the configuration of the transistor M1p, and vice versa. Moreover, in some embodiments with little or no common mode noise, the center tap can be at 0 V. In some embodiments, the configuration of FIG. 14A can increase differential mode noise.

Figure 15A:
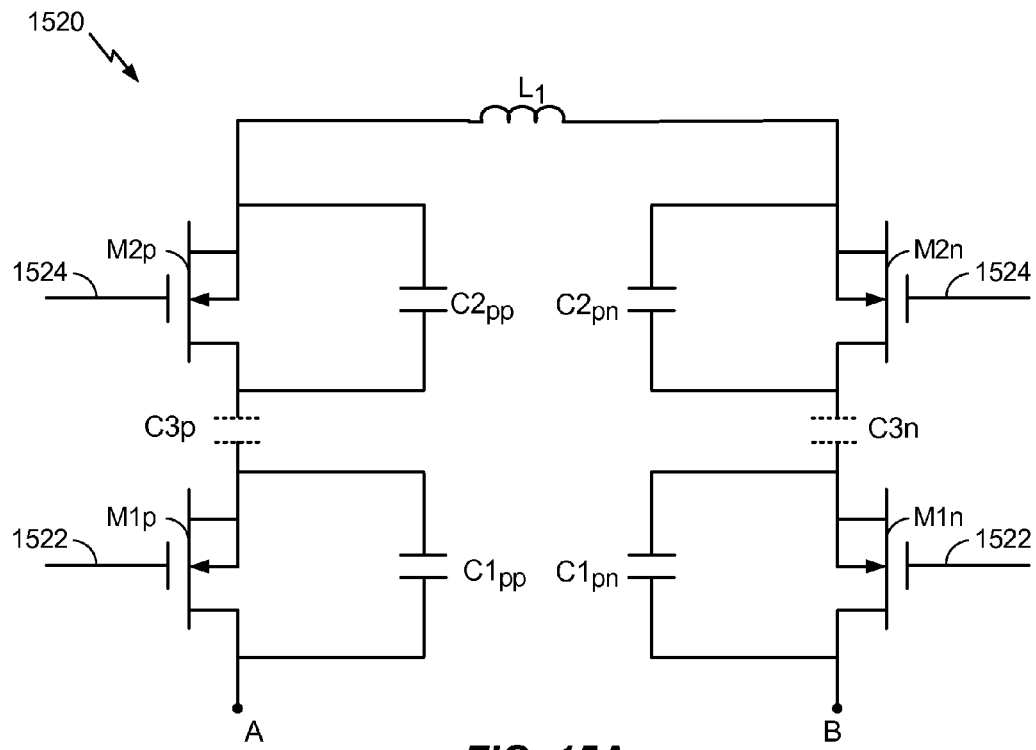
FIGS. 15A-15C are schematic diagrams of another exemplary tuning circuit 1520 that may be used in the wireless power system of FIG. 8, according to exemplary embodiments of the present invention.
Figure 15B:
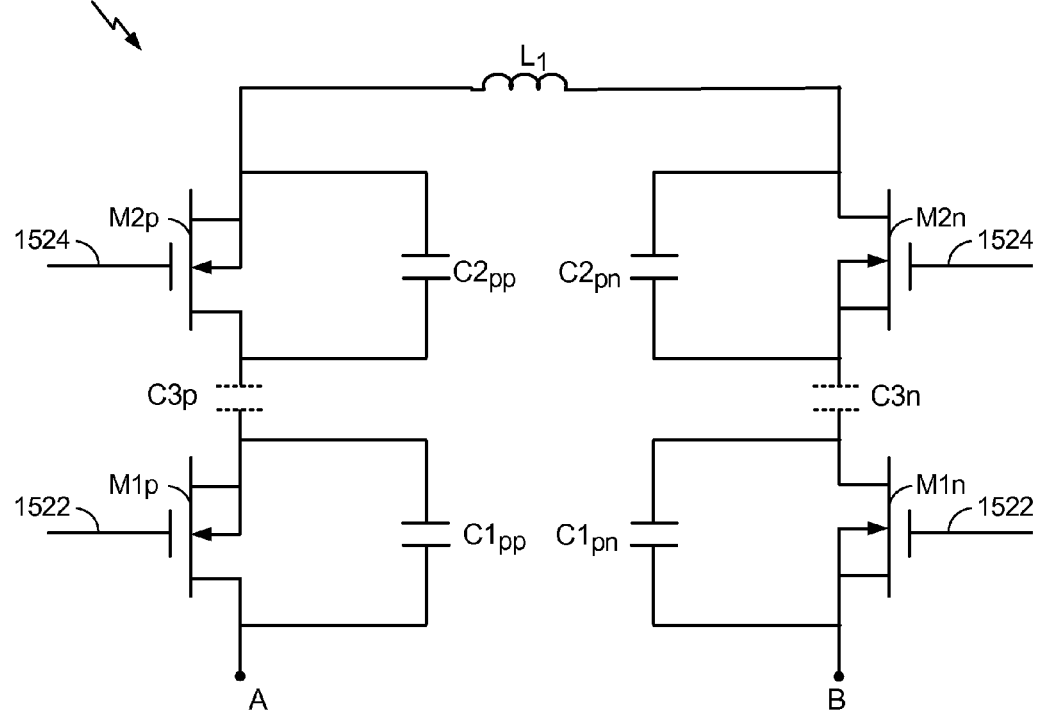
Figure 15C:
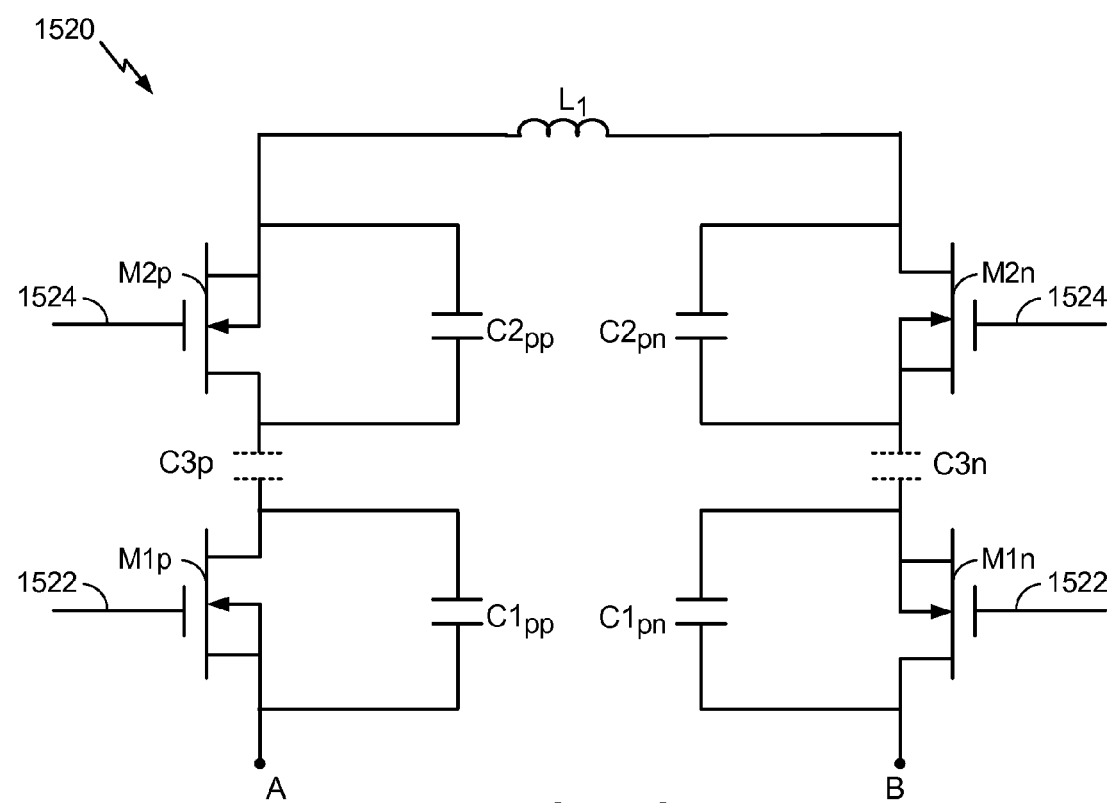

FIGS. 15A-15C are schematic diagrams of another exemplary tuning circuit 1520 that may be used in the wireless power system 800 of FIG. 8, according to exemplary embodiments of the present invention. Although various circuits are shown in an exemplary configuration, a person having ordinary skill in the art will appreciate that one or more circuits shown can be rearranged or omitted, and additional circuits not shown can be added. For example, although the tuning circuit 1520 is shown in a differential configuration, aspects of the tuning circuit 1520 can also apply to a single-ended configuration. Moreover, although the tuning circuit 1520 is shown in an untapped configuration, aspects of the tuning circuit 1520 can also apply to a center tapped configuration.

FIG. 15A shows a symmetrical differential tuning circuit 1520 including a first transistor M1p, a second transistor M1n, a third transistor M2p, a fourth transistor M2n, a first reactive element $C1_{pp}$, a second reactive element $C1_{pn}$, a third reactive element $C2_{pp}$, a fourth reactive element $C2_{pn}$, and a load L1. In some embodiments, the tuning circuit 1520 can further include a fifth reactive element C3p and a sixth reactive element C3n. The tuning circuit 1520 is configured to receive a first control signal 1522, a second control signal 1522, a positive differential signal line A, and a negative differential signal line B. In some embodiments, the first control signal 1522 and the second control signal 1524 can be the same control signal.

As shown, a first switch includes the transistor M1p having a source, a drain, and a gate. The drain is coupled to a first side of the first reactive element $C1_{pp}$ and to a positive differential signal input A. The source is coupled to a second side of the first reactive element $C1_{pp}$, to a drain of the third transistor M2p, and to a first side of the third reactive element $C2_{pp}$. The gate is coupled to the first control signal 1522. In some embodiments, the source can be coupled to a first side of the fifth reactive element C3p.

A second switch includes the transistor M1n having a source, a drain, and a gate. The drain is coupled to a first side of the second reactive element $C1_{pn}$ and to a negative differential signal input B. The source is coupled to a second side of the second reactive element $C1_{pn}$, to a drain of the fourth transistor M2n, and to a first side of the fourth reactive element $C2_{pn}$. The gate is coupled to the first control signal 1522. In some embodiments, the source can be coupled to a first side of the sixth reactive element C3n.

A third switch includes the transistor M2p having a source, a drain, and a gate. The drain is coupled to a first side of the third reactive element $C2_{pp}$, to the source of the first transistor M1p, and to the second side of the first reactive element $C1_{pp}$. The source is coupled to a second side of the third reactive element $C2_{pp}$ and to a first end of the load L1. The gate is coupled to the second control signal 1524. In some embodiments, the drain can be coupled to a second side of the fifth reactive element C3p.

A fourth switch includes the transistor M2n having a source, a drain, and a gate. The drain is coupled to a first side of the fourth reactive element $C2_{pn}$, to the source of the second transistor M1p, and to the second side of the second reactive element $C1_{pp}$. The source is coupled to a second side of the fourth reactive element $C2_{pn}$ and to a second end of the load L1. The gate is coupled to the second control signal 1524. In some embodiments, the drain can be coupled to a second side of the sixth reactive element C3n.

In some embodiments, the symmetrical differential tuning circuit 1520 shown in FIG. 15A can be a perfectly symmetrical double switching stage with no center tap. The transistor pairs M1p and M1n, and M2p and M2n, can be configured to have opposite currents running through them at any given moment. Accordingly, while the first transistor M1p experiences its maximum drain-source voltage (and therefore minimum open-state capacitance), the second transistor M1n can experience its minimum drain-source voltage (and therefore maximum open-state capacitance). Similarly, while the third transistor M2p experiences its maximum drain-source voltage (and therefore minimum open-state capacitance), the fourth transistor M2n can experience its minimum drain-source voltage (and therefore maximum open-state capacitance). In some embodiments, the imbalance between open-state capacitance can cause an imbalance which can manifests as common mode noise.

In some embodiments, the configuration of FIG. 15A can reduce differential mode noise because capacitance in each transistor pair M1p and M1n, and M2p and M2n, are inversely related. Thus, in some embodiments, one or more transistors M1n, M1p, M1n, and/or M2p can generate, cause, or create a harmonic that at least partially cancels a harmonic generated, caused, or created by one or more other transistors M1n, M1p, M1n, and/or M2p, and vice versa. In some cases one or more transistors M1n, M1p, M1n, and/or M2p do not generate, cause, or create a harmonic, that they otherwise would in the absence of the configuration shown in FIG. 15A, for example, by virtue of the configuration of one or more other transistors M1n, M1p, M1n, and/or M2p, and vice versa.

FIG. 15B shows a symmetrical differential tuning circuit 1520 including a first transistor M1p, a second transistor M1n, a third transistor M2p, a fourth transistor M2n, a first reactive element $C1_{pp}$, a second reactive element $C1_{pn}$, a third reactive element $C2_{pp}$, a fourth reactive element $C2_{pn}$, and a load L1. In some embodiments, the tuning circuit 1520 can further include a fifth reactive element C3p and a sixth reactive element C3n. The tuning circuit 1520 is configured to receive a first control signal 1522, a second control signal 1522, a positive differential signal line A, and a negative differential signal line B. In some embodiments, the first control signal 1522 and the second control signal 1524 can be the same control signal.

As shown, a first switch includes the transistor M1p having a source, a drain, and a gate. The drain is coupled to a first side of the first reactive element $C1_{pp}$ and to a positive differential signal input A. The source is coupled to a second side of the first reactive element $C1_{pp}$, to a drain of the third transistor M2p, and to a first side of the third reactive element $C2_{pp}$. The gate is coupled to the first control signal 1522. In some embodiments, the source can be coupled to a first side of the fifth reactive element C3p.

A second switch includes the transistor M1n having a source, a drain, and a gate. The source is coupled to a first side of the second reactive element $C1_{pn}$ and to a negative differential signal input B. The drain is coupled to a second side of the second reactive element $C1_{pn}$, to a source of the fourth transistor M2n, and to a first side of the fourth reactive element $C2_{pn}$. The gate is coupled to the first control signal 1522. In some embodiments, the drain can be coupled to a first side of the sixth reactive element C3n.

A third switch includes the transistor M2p having a source, a drain, and a gate. The drain is coupled to a first side of the third reactive element $C2_{pp}$, to the source of the first transistor M1p, and to the second side of the first reactive element $C1_{pp}$. The source is coupled to a second side of the third reactive element $C2_{pp}$ and to a first end of the load L1. The gate is coupled to the second control signal 1524. In some embodiments, the drain can be coupled to a second side of the fifth reactive element C3p.

A fourth switch includes the transistor M2n having a source, a drain, and a gate. The source is coupled to a first side of the fourth reactive element $C2_{pn}$, to the drain of the second transistor M1p, and to the second side of the second reactive element $C1_{pp}$. The drain is coupled to a second side of the fourth reactive element $C2_{pn}$ and to a second end of the load L1. The gate is coupled to the second control signal 1524. In some embodiments, the source can be coupled to a second side of the sixth reactive element C3n.

In some embodiments, the symmetrical differential tuning circuit 1520 shown in FIG. 15B can be a modification of the tuning circuit 1420 shown in FIG. 14A, wherein the second transistor M1n has been reversed, and wherein the fourth transistor M2n has been reversed. Accordingly, the transistor pairs M1p and M1n, and M2p and M2n, can be configured to have the same currents running through them at any given moment. Thus, while the first transistor M1p experiences its maximum drain-source voltage (and therefore minimum open-state capacitance), the second transistor M1n can also experience its maximum drain-source voltage (and therefore minimum open-state capacitance), and vice versa. Similarly, while the third transistor M2p experiences its maximum drain-source voltage (and therefore minimum open-state capacitance), the fourth transistor M2n can also experience its maximum drain-source voltage (and therefore minimum open-state capacitance), and vice versa.

In some embodiments, the balance between open-state capacitance can decrease common mode noise. Thus, in some embodiments, one or more transistors M1n, M1p, M1n, and/or M2p can generate, cause, or create a harmonic that at least partially cancels a harmonic generated, caused, or created by one or more other transistors M1n, M1p, M1n, and/or M2p, and vice versa. In some cases one or more transistors M1n, M1p, M1n, and/or M2p do not generate, cause, or create a harmonic, that they otherwise would in the absence of the configuration shown in FIG. 15B, for example, by virtue of the configuration of one or more other transistors M1n, M1p, M1n, and/or M2p, and vice versa. In some embodiments, the configuration of FIG. 14A can increase differential mode noise.

FIG. 15C shows a symmetrical differential tuning circuit 1520 including a first transistor M1p, a second transistor M1n, a third transistor M2p, a fourth transistor M2n, a first reactive element $C1_{pp}$, a second reactive element $C1_{pn}$, a third reactive element $C2_{pp}$, a fourth reactive element $C2_{pn}$, and a load L1. In some embodiments, the tuning circuit 1520 can further include a fifth reactive element C3p and a sixth reactive element C3n. The tuning circuit 1520 is configured to receive a first control signal 1522, a second control signal 1522, a positive differential signal line A, and a negative differential signal line B. In some embodiments, the first control signal 1522 and the second control signal 1524 can be the same control signal.

As shown, a first switch includes the transistor M1p having a source, a drain, and a gate. The source is coupled to a first side of the first reactive element $C1_{pp}$ and to a positive differential signal input A. The drain is coupled to a second side of the first reactive element $C1_{pp}$, to a drain of the third transistor M2p, and to a first side of the third reactive element $C2_{pp}$. The gate is coupled to the first control signal 1522. In some embodiments, the drain can be coupled to a first side of the fifth reactive element C3p.

A second switch includes the transistor M1n having a source, a drain, and a gate. The drain is coupled to a first side of the second reactive element $C1_{pn}$ and to a negative differential signal input B. The source is coupled to a second side of the second reactive element $C1_{pn}$, to a source of the fourth transistor M2n, and to a first side of the fourth reactive element $C2_{pn}$. The gate is coupled to the first control signal 1522. In some embodiments, the source can be coupled to a first side of the sixth reactive element C3n.

A third switch includes the transistor M2p having a source, a drain, and a gate. The drain is coupled to a first side of the third reactive element $C2_{pp}$, to the source of the first transistor M1p, and to the second side of the first reactive element $C1_{pp}$. The source is coupled to a second side of the third reactive element $C2_{pp}$ and to a first end of the load L1. The gate is coupled to the second control signal 1524. In some embodiments, the drain can be coupled to a second side of the fifth reactive element C3p.

A fourth switch includes the transistor M2n having a source, a drain, and a gate. The source is coupled to a first side of the fourth reactive element $C2_{pn}$, to the drain of the second transistor M1p, and to the second side of the second reactive element $C1_{pp}$. The drain is coupled to a second side of the fourth reactive element $C2_{pn}$ and to a second end of the load L1. The gate is coupled to the second control signal 1524. In some embodiments, the source can be coupled to a second side of the sixth reactive element C3n.

In some embodiments, the symmetrical differential tuning circuit 1520 shown in FIG. 15C can be a modification of the tuning circuit 1420 shown in FIG. 14B, wherein the configuration of the first stage has been reversed. Accordingly, the transistor pairs M1p and M1n, and M2p and M2n, can still be configured to have the same currents running through them at any given moment, and transistors can be reversed within each successive stage. Thus, while the first transistor M1p experiences its maximum drain-source voltage (and therefore minimum open-state capacitance), the second transistor M1n can also experience its maximum drain-source voltage (and therefore minimum open-state capacitance), and vice versa. Similarly, while the third transistor M2p experiences its maximum drain-source voltage (and therefore minimum open-state capacitance), the fourth transistor M2n can also experience its maximum drain-source voltage (and therefore minimum open-state capacitance), and vice versa.

In some embodiments, the configuration of FIG. 15C can reduce or eliminate common mode noise, and consecutive stages can be configured to reduce or eliminate differential mode noise when both stages are in the open state. Thus, in some embodiments, one or more transistors M1n, M1p, M1n, and/or M2p can generate, cause, or create a harmonic that at least partially cancels a harmonic generated, caused, or created by one or more other transistors M1n, M1p, M1n, and/or M2p, and vice versa. In some cases one or more transistors M1n, M1p, M1n, and/or M2p do not generate, cause, or create a harmonic, that they otherwise would in the absence of the configuration shown in FIG. 15C, for example, by virtue of the configuration of one or more other transistors M1n, M1p, M1n, and/or M2p, and vice versa.

With particular respect to the embodiments of FIGS. 15A-15C, and further with respect to other embodiments discussed herein, one or two stages are discussed. A person having ordinary skill in the art will appreciate, however, that additional stages can be added. Additional stages can include any combination of transistor configurations. For example, the drain-source polarity of switching transistors can be reversed for each successive stage (for example, continuing the pattern shown and discussed with respect to FIG. 15C). In some embodiments, consecutive stages can be configured to reduce differential mode noise when stages are in an open state. In some embodiments, successive stages can be configured to selectively enable and/or disable different sized reactive elements. For example, capacitances can double (or half) at each consecutive stage), thereby allowing binary tuning.

Figure 16A:
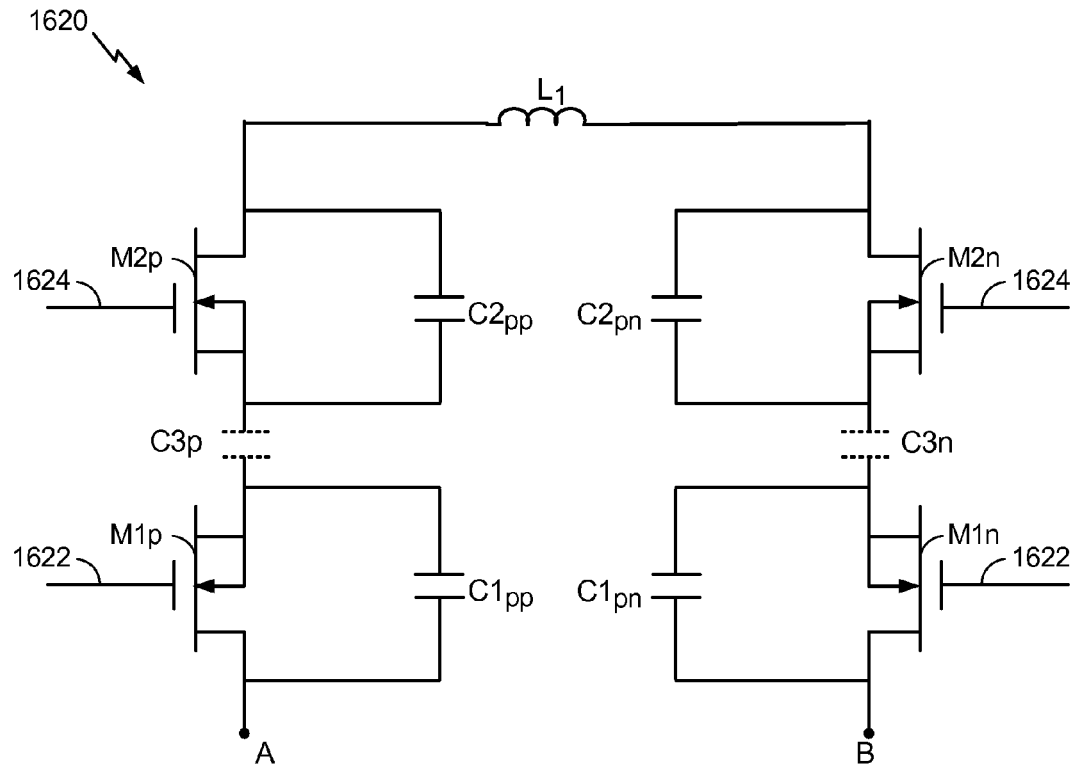
FIGS. 16A-16B are schematic diagrams of another exemplary tuning circuit that may be used in the wireless power system of FIG. 8, according to exemplary embodiments of the present invention.
Figure 16B:
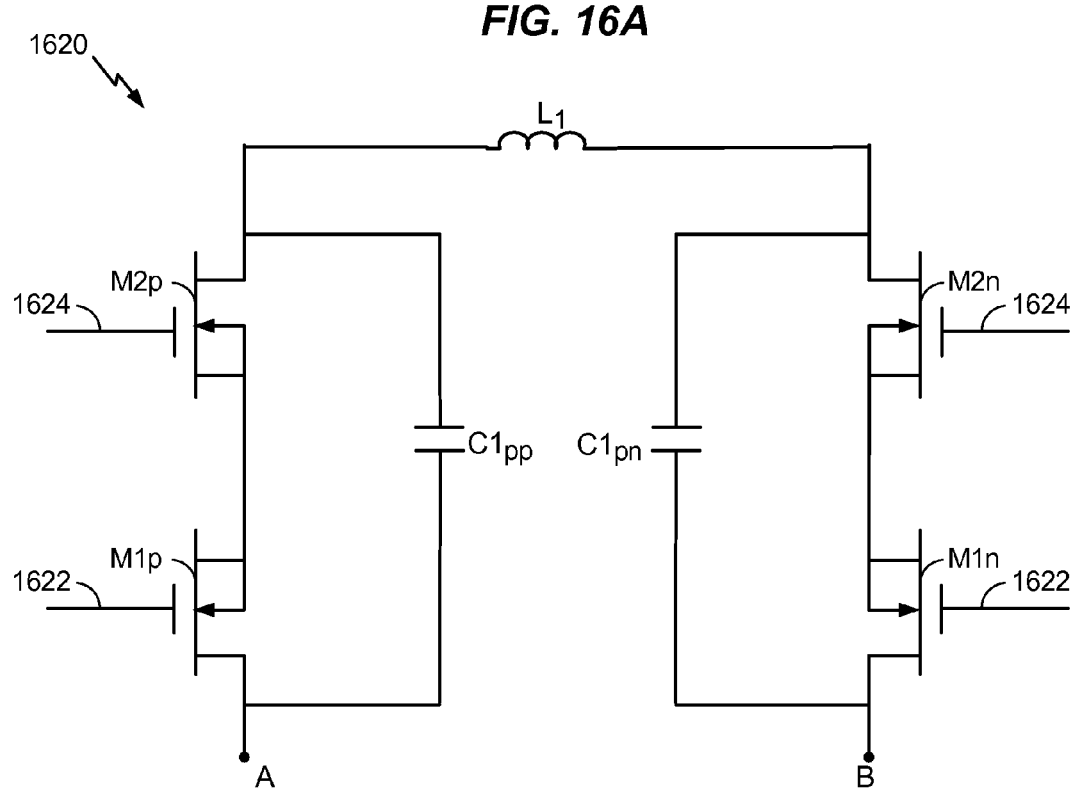

FIGS. 16A-16B are schematic diagrams of another exemplary tuning circuit 1620 that may be used in the wireless power system 800 of FIG. 8, according to exemplary embodiments of the present invention. Although various circuits are shown in an exemplary configuration, a person having ordinary skill in the art will appreciate that one or more circuits shown can be rearranged or omitted, and additional circuits not shown can be added. For example, although the tuning circuit 1620 is shown in a differential configuration, aspects of the tuning circuit 1620 can also apply to a single-ended configuration. Moreover, although the tuning circuit 1620 is shown in an untapped configuration, aspects of the tuning circuit 1620 can also apply to a center tapped configuration.

FIG. 16A shows a symmetrical differential tuning circuit 1620 including a first transistor M1p, a second transistor M1n, a third transistor M2p, a fourth transistor M2n, a first reactive element $C1_{pp}$, a second reactive element $C1_{pn}$, a third reactive element $C2_{pp}$, a fourth reactive element $C2_{pn}$, and a load L1. In some embodiments, the tuning circuit 1620 can further include a fifth reactive element $C3p$ and a sixth reactive element $C3n$. The tuning circuit 1620 is configured to receive a first control signal 1622, a second control signal 1622, a positive differential signal line A, and a negative differential signal line B. In some embodiments, the first control signal 1622 and the second control signal 1624 can be the same control signal.

As shown, a first switch includes the transistor M1p having a source, a drain, and a gate. The drain is coupled to a first side of the first reactive element $C1_{pp}$ and to a positive differential signal input A. The source is coupled to a second side of the first reactive element $C1_{pp}$, to a source of the third transistor M2p, and to a first side of the third reactive element $C2_{pp}$. The gate is coupled to the first control signal 1622. In some embodiments, the source can be coupled to a first side of the fifth reactive element $C3p$.

A second switch includes the transistor M1n having a source, a drain, and a gate. The source is coupled to a first side of the second reactive element $C1_{pn}$ and to a negative differential signal input B. The drain is coupled to a second side of the second reactive element $C1_{pn}$, to a drain of the fourth transistor M2n, and to a first side of the fourth reactive element $C2_{pn}$. The gate is coupled to the first control signal 1622. In some embodiments, the drain can be coupled to a first side of the sixth reactive element $C3n$.

A third switch includes the transistor M2p having a source, a drain, and a gate. The drain is coupled to a first side of the third reactive element $C2_{pp}$, to the source of the first transistor M1p, and to the second side of the first reactive element $C1_{pp}$. The source is coupled to a second side of the third reactive element $C2_{pp}$ and to a first end of the load L1. The gate is coupled to the second control signal 1624. In some embodiments, the drain can be coupled to a second side of the fifth reactive element $C3p$.

A fourth switch includes the transistor M2n having a source, a drain, and a gate. The source is coupled to a first side of the fourth reactive element $C2_{pn}$, to the drain of the second transistor M1p, and to the second side of the second reactive element $C1_{pp}$. The drain is coupled to a second side of the fourth reactive element $C2_{pn}$ and to a second end of the load L1. The gate is coupled to the second control signal 1624. In some embodiments, the source can be coupled to a second side of the sixth reactive element $C3n$.

In some embodiments, the symmetrical differential tuning circuit 1620 shown in FIG. 16A can include opposing transistors pairs M1p and M2p, and M1n and M2n, on each side with opposing current flows. Thus, while the first transistor M1p experiences its maximum drain-source voltage (and therefore minimum open-state capacitance), the third transistor M2p can experience its minimum drain-source voltage (and therefore maximum open-state capacitance), and vice versa. Similarly, while the second transistor M1n experiences its maximum drain-source voltage (and therefore minimum open-state capacitance), the fourth transistor M2n can experience its minimum drain-source voltage (and therefore maximum open-state capacitance), and vice versa.

In some embodiments, the configuration of FIG. 16A can reduce or eliminate common mode noise, and consecutive stages can be configured to reduce or eliminate differential mode noise when both stages are in the open state. Thus, in some embodiments, one or more transistors M1n, M1p, M1n, and/or M2p can generate, cause, or create a harmonic that at least partially cancels a harmonic generated, caused, or created by one or more other transistors M1n, M1p, M1n, and/or M2p, and vice versa. In some cases one or more transistors M1n, M1p, M1n, and/or M2p do not generate, cause, or create a harmonic, that they otherwise would in the absence of the configuration shown in FIG. 16A, for example, by virtue of the configuration of one or more other transistors M1n, M1p, M1n, and/or M2p, and vice versa.

In certain embodiments, the tuning circuit 1620 shown in FIG. 16A can include matching stages. For example, the first reactive element $C1_{pp}$ can match the third reactive element $C2_{pp}$, the second reactive element $C1_{pn}$ can match the fourth reactive element $C2_{pn}$, and so forth. Moreover, the first and second stages can be driven together. For example, the first control signal 1522 can be the same as the second control signal 1524.

FIG. 16B shows a symmetrical differential tuning circuit 1620 including a first transistor M1p, a second transistor M1n, a third transistor M2p, a fourth transistor M2n, a first reactive element $C1_{pp}$, a second reactive element $C1_{pn}$, and a load L1. The tuning circuit 1620 is configured to receive a first control signal 1622, a second control signal 1622, a positive differential signal line A, and a negative differential signal line B. In some embodiments, the first control signal 1622 and the second control signal 1624 can be the same control signal.

As shown, a first switch includes the first transistor M1p and the third transistor M2p, each having a source, a drain, and a gate. The drain of the first transistor M1p is coupled to a first side of the first reactive element $C1_{pp}$ and to a positive differential signal input A. The source of the first transistor M1p is coupled to the source of the third transistor M2p. The gate of the first transistor M1p is coupled to the first control signal 1622. The source of the third transistor M1p is coupled to the source of the first transistor M1p. The drain of the third transistor M1p is coupled to a second end of the first reactive element $C1_{pp}$ and to a first end of the load L1. The gate of the third transistor M1p is coupled to the second control signal 1624.

A second switch includes the second transistor M1n and the fourth transistor M2n, each having a source, a drain, and a gate. The drain of the second transistor M1n is coupled to a first side of the second reactive element $C1_{pn}$ and to a negative differential signal input B. The source of the second transistor M1n is coupled to the source of the fourth transistor M2n. The gate of the second transistor M1n is coupled to the first control signal 1622. The source of the fourth transistor M1n is coupled to the source of the second transistor M1n. The drain of the fourth transistor M1n is coupled to a second end of the second reactive element $C1_{pp}$ and to a second end of the load L1. The gate of the fourth transistor M1p is coupled to the second control signal 1624.

In some embodiments, the symmetrical differential tuning circuit 1620 shown in FIG. 16B can include another embodiment of that shown in FIG. 16A. Thus, while the first transistor M1p experiences its maximum drain-source voltage (and therefore minimum open-state capacitance), the third transistor M2p can experience its minimum drain-source voltage (and therefore maximum open-state capacitance), and vice versa. Similarly, while the second transistor M1n experiences its maximum drain-source voltage (and therefore minimum open-state capacitance), the fourth transistor M2n can experience its minimum drain-source voltage (and therefore maximum open-state capacitance), and vice versa.

In some embodiments, the configuration of FIG. 16B can reduce or eliminate common mode noise, and consecutive stages can be configured to reduce or eliminate differential mode noise when both stages are in the open state. Thus, in some embodiments, one or more transistors M1n, M1p, M1n, and/or M2p can generate, cause, or create a harmonic that at least partially cancels a harmonic generated, caused, or created by one or more other transistors M1n, M1p, M1n, and/or M2p, and vice versa. In some cases one or more transistors M1n, M1p, M1n, and/or M2p do not generate, cause, or create a harmonic, that they otherwise would in the absence of the configuration shown in FIG. 16B, for example, by virtue of the configuration of one or more other transistors M1n, M1p, M1n, and/or M2p, and vice versa.

With reference again to FIG. 8, in some cases it may be difficult or undesirable to directly electrically connect a tuning circuit 852 along with reactive elements to the transmit circuit 850. In one embodiment, rather than directly electrically connecting reactive elements and tuning circuits to the transmit circuit 850, tuning circuits may be placed in a parasitic coil (e.g., a passive element that may wirelessly retransmit/relay energy received or transmitted from a transmit coil 814 or a receive coil 818) that is configured to couple with the transmit circuit 850 including the transmit coil 814. Tuning the reactance of a parasitic coil inductively coupled to the transmit circuit 850 may adjust the impedance presented to the transmit circuit 850 so that the transmit circuit 850 may resonate at a desired frequency as described above.

Figure 17:
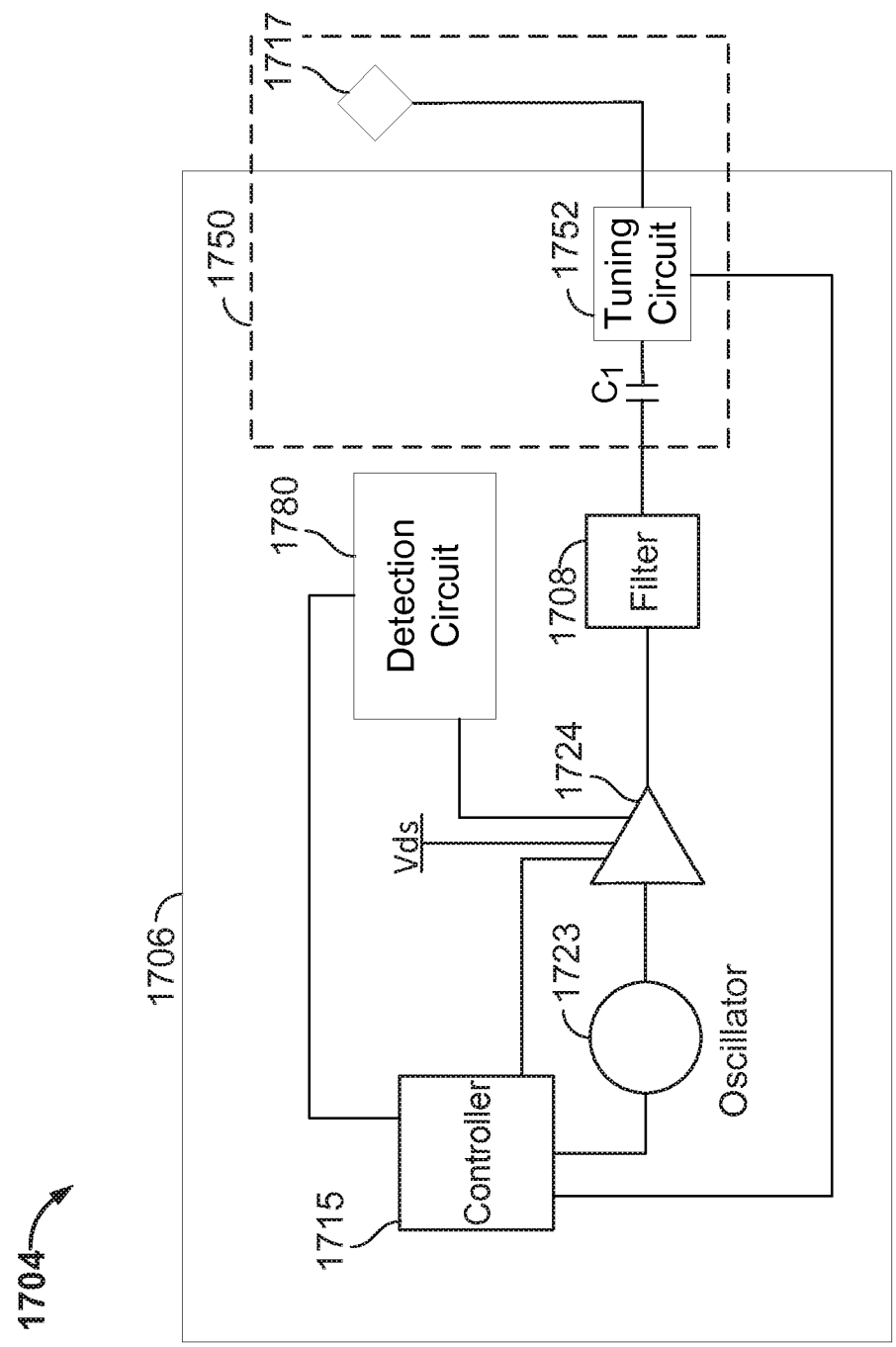
FIG. 17 is a functional block diagram of a transmitter that may be used in the wireless power transfer system of FIG. 1.

FIG. 17 is a functional block diagram of a transmitter 1704 that may be used in the wireless power transfer system of FIG. 1. The transmitter 174 includes a portion of transmit circuitry 1706 that includes a detection circuit 1780 for detecting a change in the resonant frequency of a transmit circuit 1750. Similar to as shown in FIG. 4, the transmit circuitry 1706 includes a transmit circuit 1750 including a capacitor $C_1$ and a transmit coil 1714. The transmit circuit 1750 may be any of the transmit circuits described above or any combination thereof. The transmit circuitry 1706 further includes a controller 1715 and an oscillator 1723 that drives a driver circuit 1724 that may drive the transmit circuit 1750 via a filter circuit 408. To determine how and when to switch in various reactive elements, a detection circuit 1780 may be used to detect a change in the resonant frequency (i.e., detect a resonant condition) of the transmit circuit 1750.

In one embodiment, the detection circuit 1780 may be able to detect an amount of current through a driver circuit 1524 to determine a change in the resonant frequency of the transmit circuit 1750. More specifically, prior to positioning any devices within a charging region of a wireless power transmitter 1704 and while a reactance of the wireless power system is zero, an amount of current through the driver circuit 1724 may be sensed using the detection circuit 1780 to determine an optimal, baseline current level at a resonance condition. Thereafter, while one or more devices are positioned within a charging region of the wireless power transmitter 1704 the current through the driver circuit 1724 may be sensed by the detection circuit 1780. In one embodiment, the detection circuit 1780 may provide information to a controller 1715 to control a tuning circuit 1752 of the transmit circuit 1750 as described above to adjust the reactance based on the amount of current. The tuning circuit 1752 may be any of the tuning circuits described above or any combination thereof. As such, the resonant frequency of the transmit circuit 1750 may be adjusted according to or more of the exemplary embodiment described above with reference to FIGS. 7-16B to adjust the measured current to resemble the baseline current and, therefore, cause the reactance of the wireless power system to get as close as possible to zero.

In one embodiment, a detection circuit 1780 may constantly monitor current levels through a driver circuit 1724 while providing power to various wireless power receivers (not shown). Based on the measured current while continuously providing power, the detection circuit 1780 may determine that the transmit circuit 1750 is no longer resonating and that the reactance of the transmit circuit 1750 needs to be adjusted or tuned back to a resonant state. A tuning circuit 1752 such as those described above may be used to adjust the reactance based on the change in current.

Figure 18:
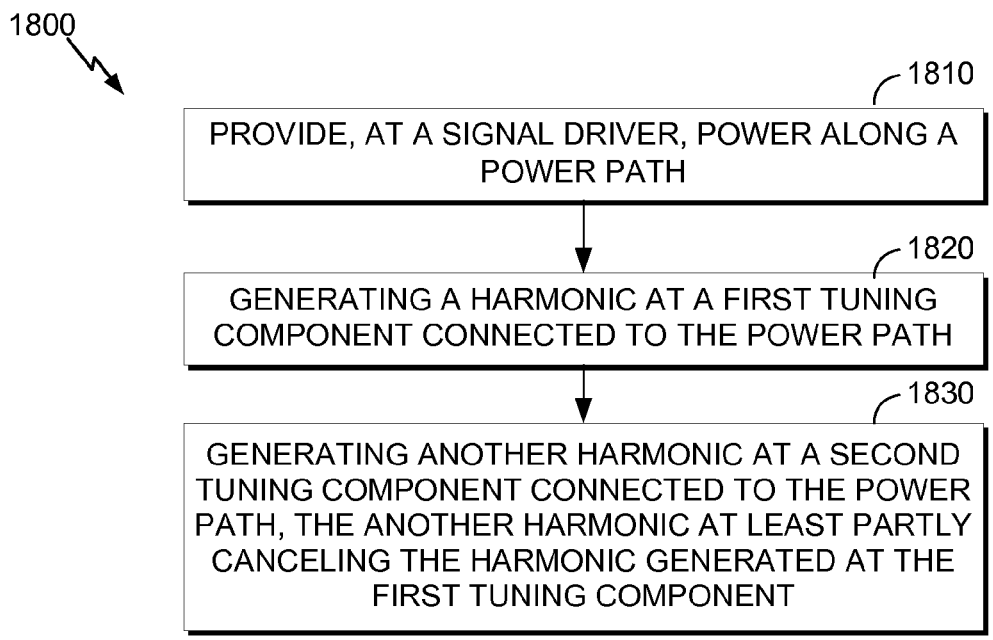
FIG. 18 is a flowchart of an exemplary method of wireless power transmission.

FIG. 18 is a flowchart 1800 of an exemplary method of wireless power transmission. Although the method of flowchart 1800 is described herein with reference to the wireless power transmission system 100 discussed above with respect to FIGS. 1-2, the transmit circuits 406, 606, 750, 850, and/or 950 described above with respect to FIGS. 4, 6, and 7-9 respectively, and the tuning circuits 1420, 1520, and 1620 described above with respect to FIGS. 14A-16B, a person having ordinary skill in the art will appreciate that the method of flowchart 1800 may be implemented by another device described herein, or any other suitable device. In an embodiment, the steps in flowchart 1800 may be performed by a processor or controller such as, for example, the controller 415 (FIG. 4) and/or the processor-signaling controller 516 (FIG. 5). Although the method of flowchart 1800 is described herein with reference to a particular order, in various embodiments, blocks herein may be performed in a different order, or omitted, and additional blocks may be added.

First, at block 1810, a signal driver provides power along a power path. For example, the driver circuit 1724 (FIG. 17) can provide power along the path from node A to node B (see, for example, FIG. 16B). In some embodiments, providing power includes providing a differential signal. In some embodiments, providing power includes providing a single-ended signal. In various embodiments, the power path can include one or more components carrying electrical signals between a driver and a transmit coil, loop, inductor, etc.

In some embodiments, the signal driver can provide wireless power to a receiver via a transmit coil having a center tap. In some embodiments, the signal driver can provide power to a receive circuit to provide power to the load, the receiver circuit being configured to resonate at the resonant frequency. For example, the driver circuit 1724 can provide wireless charging power to the receiver 118 (FIG. 1).

Next, at block 1820, a first tuning circuit along the power path generates a harmonic. In some embodiments, this harmonic can be referred to herein as a "first counted harmonic," to distinguish the harmonic from the "fundamental frequency" also known generally as a "first harmonic." In various embodiments, the harmonic can include common mode noise and/or differential mode noise. In some embodiments, the harmonic can include harmonic distortion. In some embodiments, the harmonic can cause one or more spurious emissions. In some embodiments, the harmonic can be caused by one or more characteristics of the first tuning circuit.

In some embodiments, the first tuning circuit can include the transistor M1p as shown in any of FIGS. 13A-16B. The harmonic can be at least partially caused by a voltage-dependent capacitance of the transistor M1p when in an open state. In various embodiments, the drain-source voltage across the transistor M1p can vary according to a polarity, orientation, and/or configuration of the transistor M1p.

Then, at block 1830, a second tuning circuit along the power path generates another harmonic at least partly canceling the harmonic generated at the first tuning circuit. In some embodiments, this another harmonic can be referred to herein as a "second counted harmonic," to distinguish the harmonic from an "octave" also known generally as a "second harmonic." In various embodiments, the another harmonic can include common mode noise and/or differential mode noise. In some embodiments, the another harmonic can include harmonic distortion. In some embodiments, the another harmonic can cause one or more spurious emissions. In some embodiments, the another harmonic can be caused by one or more characteristics of the second tuning circuit.

In some embodiments, the second tuning circuit can include the transistor M1n as shown in any of FIGS. 13A-16B. The harmonic can be at least partially caused by a voltage-dependent capacitance of the transistor M1p when in an open state. In various embodiments, the drain-source voltage across the transistor M1p can vary according to a polarity, orientation, and/or configuration of the transistor M1p.

In some embodiments, the second tuning circuit can include the transistor M2p as shown in any of FIGS. 15A-16B. In various embodiments, the first and second tuning circuit can include any pair or combination of transistors described herein, or any pair or combination of other circuits described herein.

In some embodiments, at least one of the first and second tuning circuits includes a switch configured to adjust a reactance of the power path. In various embodiments, at least one of the first and second tuning circuits includes switch in parallel with a reactive element, and at least one of the first and second tuning circuits is configured to adjust the reactance of the transmit circuit by opening or closing the switch. In various embodiments, the reactive element includes a capacitor.

For example, the first tuning circuit can include the transistor M1p configured to short or open the terminals of the first reactance $C1_{pp}$. As another example, the second tuning circuit can include the transistor M1n configured to short or open the terminals of the second reactance $C1_{pn}$.

In some embodiments, at least one of the first and second tuning circuits includes a two or more transistors, the two or more transistors being in parallel with a reactive element. The method can further include adjusting the reactance of the transmit circuit by enabling the two or more transistors. For example, the first tuning circuit can include the first and third transistors M1p and M2p of FIG. 16B. As another example, the second tuning circuit can include the second and fourth transistors M1n and M2n of FIG. 16B. In various embodiments, the first and second tuning circuits can include one or more reactive elements such as, for example, the reactive elements $C1_{pp}$ and/or $C1_{pn}$ of FIG. 16B.

Figure 19:
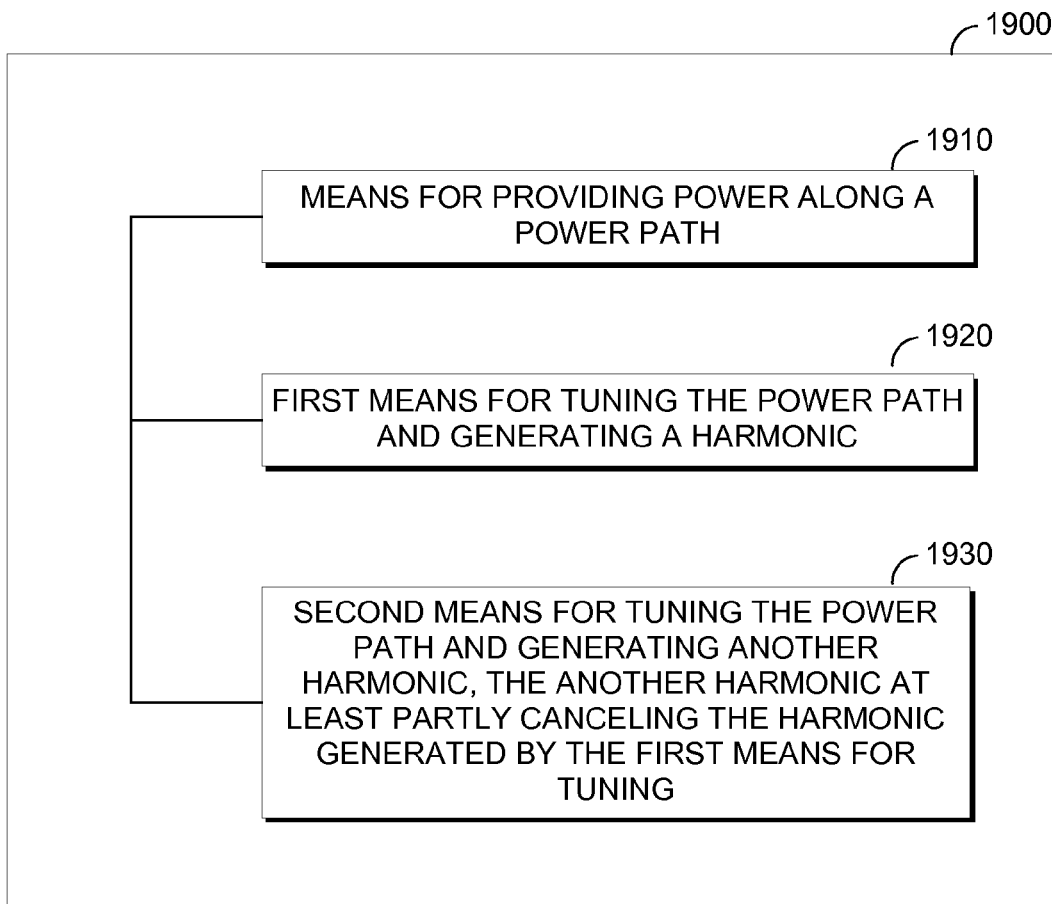
FIG. 19 is a functional block diagram of a system for wireless power transmission, in accordance with an exemplary embodiment of the invention.

FIG. 19 is a functional block diagram of a system for wireless power transmission 1900, in accordance with an exemplary embodiment of the invention. The system for wireless power transmission 1900 includes means 1910 for providing power along a power path, first means 1920 for tuning the power path and generating a harmonic, and second means 1930 for tuning the power path and generating another harmonic, the another harmonic at least partly canceling the harmonic generated by the first means for tuning.

In an embodiment, means 1910 for providing power along a power path can be configured to perform one or more of the functions described above with respect to block 1810 (FIG. 18). In various embodiments, the means 1910 for providing power along a power path can be implemented by one or more of the transmitters 104 (FIG. 1), 204 (FIG. 2), 604 (FIG. 6), 1704 (FIG. 17) and/or drivers 224 (FIG. 2), 424 (FIG. 4), 624 (FIG. 6), 1724 (FIG. 17).

In an embodiment, first means 1920 for tuning the power path and generating a harmonic can be configured to perform one or more of the functions described above with respect to block 1820 (FIG. 18). In various embodiments, first means 1920 for tuning the power path and generating a harmonic can be implemented by one or more of the tuning circuits 1320 (FIG. 13), 1420 (FIG. 14), 1520 (FIG. 15), 1620 (FIG. 16), transistors M1p, M2p, M1n, M2n (FIG. 16), reactance elements $C1_{pp}$, $C2_{pp}$, $C1_{pn}$, $C2_{pn}$, etc.

In an embodiment, second means 1930 for tuning the power path and generating another harmonic can be configured to perform one or more of the functions described above with respect to block 1820 (FIG. 18). In various embodiments, second means 1930 for tuning the power path and generating another harmonic can be implemented by one or more of the tuning circuits 1320 (FIG. 13), 1420 (FIG. 14), 1520 (FIG. 15), 1620 (FIG. 16), transistors M1p, M2p, M1n, M2n (FIG. 16), reactance elements $C1_{pp}$, $C2_{pp}$, $C1_{pn}$, $C2_{pn}$, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative circuits, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware circuits, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. An exemplary storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete circuits in a user terminal.

In one or more exemplary embodiments, the functions described may be implemented in hardware, software, firmware, or any combination thereof. If implemented in software, the functions may be stored on or transmitted over as one or more instructions or code on a computer readable medium. Computer readable media includes both computer storage media and communication media including any medium that facilitates transfer of a computer program from one place to another. A storage media may be any available media that may be accessed by a computer. By way of example, and not limitation, such computer readable media may comprise RAM, ROM, EEPROM, CD ROM or other optical disk storage, magnetic disk storage or other magnetic storage devices, or any other medium that may be used to carry or store desired program code in the form of instructions or data structures and that may be accessed by a computer. Also, any connection is properly termed a computer readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A device configured to provide wireless power, comprising:
   a signal driver configured to provide power along a power path;
   a first tuning circuit along the power path, configured to tune reactance at the signal driver; and
   a second tuning circuit along the power path, configured to tune reactance at the signal driver and to at least partly cancel a harmonic generated at the first tuning circuit.

2. The device of claim 1, wherein at least one of the first and second tuning circuits comprises a switch configured to adjust a reactance of the power path.

3. The device of claim 2, wherein at least one of the first and second tuning circuits comprises a switch in parallel with a reactive element, and wherein at least one of the first and second tuning circuits is configured to adjust the reactance of the transmit circuit by opening or closing the switch.

4. The device of claim 3, wherein the reactive element comprises a capacitor.

5. The device of claim 1, further comprising a transmit coil having a center tap.

6. The device of claim 1, wherein the signal driver comprises a differential driver.

7. The device of claim 1, wherein the signal driver comprises a single-ended driver.

8. The device of claim 1, wherein at least one of the first and second tuning circuits comprises a two or more transistors, the two or more transistors being in parallel with a reactive element, and wherein at least one of the first and second tuning circuits is configured to adjust the reactance of the transmit circuit by enabling the two or more transistors.

9. The device of claim 1, wherein the transmit circuit is configured to wirelessly provide power to a receive circuit to provide power to the load, the receiver circuit being configured to resonate at the resonant frequency.

10. A method of providing wireless power, comprising:
    providing, at a signal driver, power along a power path;
    generating a harmonic at a first tuning circuit along the power path; and
    generating another harmonic at a second tuning circuit along the power path, the another harmonic at least partly canceling the harmonic generated at the first tuning circuit.

11. The method of claim 10, wherein at least one of the first and second tuning circuits comprises a switch configured to adjust a reactance of the power path.

12. The method of claim 11, wherein at least one of the first and second tuning circuits comprises a switch in parallel with a reactive element, and wherein at least one of the first and second tuning circuits is configured to adjust the reactance of the transmit circuit by opening or closing the switch.

13. The method of claim 12, wherein the reactive element comprises a capacitor.

14. The method of claim 10, further comprising providing wireless power to a receiver via a transmit coil having a center tap.

15. The method of claim 10, wherein providing power comprises providing a differential signal.

16. The method of claim 10, wherein providing power comprises providing a single-ended signal.

17. The method of claim 10, wherein at least one of the first and second tuning circuits comprises a two or more transistors, the two or more transistors being in parallel with a reactive element, the method further comprising adjusting the reactance of the transmit circuit by enabling the two or more transistors.

18. The method of claim 10, further comprising providing power to a receive circuit to provide power to the load, the receiver circuit being configured to resonate at the resonant frequency.

19. An apparatus for providing wireless power, comprising:
- means for providing power along a power path;
- first means for tuning the power path and generating a harmonic; and
- second means for tuning the power path and generating another harmonic, the another harmonic at least partly canceling the harmonic generated by the first means for tuning.

20. The apparatus of claim 19, wherein at least one of the first and second first means for tuning comprises a switch configured to adjust a reactance of the power path.

21. The apparatus of claim 20, wherein at least one of the first and second first means for tuning comprises a switch in parallel with a reactive element, and wherein at least one of the first and second tuning circuits is configured to adjust the reactance of the transmit circuit by opening or closing the switch.

* * * * *